United States Patent
Muddukrishna et al.

(10) Patent No.: US 12,526,340 B2
(45) Date of Patent: Jan. 13, 2026

(54) METHOD TO DROP PACKETS THAT ARE IRRELEVANT TO SUBSCRIBERS IN MOBILE APPLICATIONS

(71) Applicant: Telefonaktiebolaget LM Ericsson (publ), Stockholm (SE)

(72) Inventors: Ananya Muddukrishna, Enskededalen (SE); Lars Ernstrom, Mountain View, CA (US); José Araújo, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 148 days.

(21) Appl. No.: 18/257,653

(22) PCT Filed: Dec. 13, 2021

(86) PCT No.: PCT/SE2021/051238
§ 371 (c)(1),
(2) Date: Jun. 15, 2023

(87) PCT Pub. No.: WO2022/131998
PCT Pub. Date: Jun. 23, 2022

(65) Prior Publication Data
US 2024/0314216 A1 Sep. 19, 2024

Related U.S. Application Data

(60) Provisional application No. 63/127,351, filed on Dec. 18, 2020.

(51) Int. Cl.
*H04L 67/55* (2022.01)
*H04L 51/21* (2022.01)

(52) U.S. Cl.
CPC .............. *H04L 67/55* (2022.05); *H04L 51/21* (2022.05)

(58) Field of Classification Search
CPC .............................. H04L 67/55; H04L 51/21
(Continued)

(56) References Cited

U.S. PATENT DOCUMENTS 9,043,853 B2    5/2015   Stanwood et al.
9,201,716 B1 *  12/2015  Leonard ................. G06F 9/546
(Continued)

FOREIGN PATENT DOCUMENTS

EP    3363166 A1    8/2018
KR    101157041 B1  6/2012

OTHER PUBLICATIONS

Philipp M. Scholl, Brahim El Majoub, Silvia Santini, Kristof Van Laerhoven, "Connecting Wireless Sensor networks to the Robot Operating System", 2013, the 8th International Symposium on Intelligent Systems Techniques for Ad hoc and Wireless Sensor Networks (IST-AWSN) (Year: 2013).*

(Continued)

*Primary Examiner* — Wing F Chan
*Assistant Examiner* — John Fan
(74) *Attorney, Agent, or Firm* — Weisberg I.P. Law, P.A.

(57) ABSTRACT

Methods and apparatuses for packet processing. A method performed by a network function includes receiving message processing information relating to one or more publish-subscribe applications executed by one or more subscriber wireless devices. The method further includes causing a packet dropping task to be initiated to handle packets for each application, wherein each packet dropping task processes packets directed towards a given application from among applications, and wherein the processing performed by each packet dropping task comprises retaining packets directed towards the given application in a task-side message buffer until a task-side message buffer capacity is reached and discarding packets directed towards the given (Continued)

application when the task-side message buffer capacity has been reached. The method also includes initiating transmission of the packets in the task-side message buffer towards applications.

16 Claims, 13 Drawing Sheets

(58) Field of Classification Search
USPC .......................................................... 709/217
See application file for complete search history.

(56) References Cited

U.S. PATENT DOCUMENTS

| | | | |
|---|---|---|---|
| 2006/0277280 A1 | 12/2006 | Craggs | |
| 2007/0245018 A1* | 10/2007 | Bhola | H04L 51/00 709/225 |
| 2010/0238801 A1 | 9/2010 | Smith et al. | |
| 2013/0084878 A1* | 4/2013 | Chen | H04W 72/56 455/452.1 |
| 2013/0346580 A1* | 12/2013 | Kim | H04L 67/306 709/223 |
| 2015/0055509 A1* | 2/2015 | De Bus | H04L 51/043 370/254 |
| 2019/0041830 A1* | 2/2019 | Yarvis | G05B 19/042 |
| 2019/0327320 A1* | 10/2019 | Rubin | H04L 5/1469 |
| 2022/0264440 A1* | 8/2022 | Iwai | H04L 45/85 |

OTHER PUBLICATIONS

International Search Report and Written opinion dated Feb. 28, 2022 for International Application No. PCT/SE2021/051238 filed Dec. 13, 2021, consisting of 13-pages.
3GPP TS 23.501 V16.7.0; 3rd Generation Partnership Project; Technical Specification Group Services and System Aspects; System architecture for the 5G System (5GS); Stage 2 (Release 16); Dec. 2020, consisting of 450-pages.
OMG Data Distribution Service (DDS); Object Management Group; Version 1.4; Apr. 2015, consisting of 180-pages.
P. Schmuck et al.; CCM#SLAM: Robust and efficient centralized collaborative monocular simultaneous localization and mapping for robotic teams; Journal of Field Robotics, vol. 36, No. 4; Jun. 2019, consisting of 26-pages.
Cloud Core Exposure Server; Ericsson; Dec. 2020, consisting of 5-pages.
S. Saeedi et al.; Multiple-robot Simultaneous Localization and Mapping—A Review; J. Field Robotics, 33; 2016, consisting of 58-pages.
K. Scott; ROS 2 Galactic Default Middleware Announced; ROS Discourse; Dec. 2020, consisting of 3-pages.

* cited by examiner

METHOD TO DROP PACKETS THAT ARE IRRELEVANT TO SUBSCRIBERS IN MOBILE APPLICATIONS

CROSS-REFERENCE TO RELATED APPLICATIONS

This application is a Submission Under 35 U.S.C. § 371 for U.S. National Stage Patent Application of International Application No.: PCT/SE2021/051238, filed Dec. 13, 2021 entitled "METHOD TO DROP PACKETS THAT ARE IRRELEVANT TO SUBSCRIBERS IN MOBILE APPLICATIONS," which claims priority to U.S. Provisional Application No. 63/127,351, filed Dec. 18, 2020, entitled "METHOD TO DROP PACKETS THAT ARE IRRELEVANT TO SUBSCRIBERS IN MOBILE APPLICATIONS," the entireties of both of which are incorporated herein by reference.

TECHNICAL FIELD

Embodiments of the present disclosure relate to methods, wireless devices and core network nodes, and particularly methods, wireless devices and core network nodes for packet processing.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Publish-subscribe architectures, such as distributed, topic-based publish-subscribe architectures may be used for purposes such as building mobile robotics applications, as exemplified by ROS2 (version 2 of the Robotic Operating System, discussion available at https://github.com/ros2 as of 17 Dec. 2020) and Data Distribution Service (DDS, as discussed in "About the Data Distribution Service Specification" Version 1.4, available at https://www.omg.org/spec/DDS/as of 17 Dec. 2020). Publishers and subscribers in ROS2 and DDS applications specify required Quality of Service (QOS) individually on a per publisher/subscriber basis for flexibility. A QoS policy common to both ROS2 and DDS is called History. The history policy specifies the age of messages relevant to publishers and subscribers. For example, a history of 5 set by a subscriber indicates that the subscriber is only interested in the five most recent messages from publishers. In robotics applications, for sensor data, the history QoS setting is typically set to 1 (the most recent message is of interest).

Mobile robotics applications map well onto publish-subscribe architectures. The Simultaneous Localization and Mapping (SLAM) component in a mobile robot, for example, creates publishers and subscribers for pose, map, and sensor messages, as discussed in "Multiple-Robot Simultaneous Localization and Mapping: A Review" by Saeedi, S. et al., J Field Robot 33, 1 (January 2016), 3-46, available at https://doi.org/10.1002/rob.21620 as of 17 Dec. 2020. Messages that contain spatial data (such as range sensor readings, camera images, feature maps) are much larger than other types of messages (such as pose and Inertial Measurement Unit, IMU, data). Recent messages typically have higher relevance than old messages because they are closer to present time. Such relevance is easily encoded by the history QoS policy of ROS2 and DDS.

ROS2 or DDS systems typically use a circular message buffer to implement the history policy at the subscriber-side. The capacity of the buffer is typically equal to the history value set by the user, e.g., a history value of 5 creates a circular buffer of capacity 5 messages. When the buffer is full and new messages arrive, the oldest messages are overwritten. The decision to overwrite the buffer is usually taken solely by the ROS2 or DDS system at the subscriber-side.

ROS2 or DDS systems that host publishers are usually configured to send all messages to the subscriber-side faithfully, that is, not to pre-emptively abort sending by predicting when messages are going to be overwritten at the subscriber-side.

Most mobile robotics applications that perform sensor fusion, such as Visual Inertial Odometry, VIO, and SLAM applications, have built-in error handling mechanisms for robustness, as discussed in "Multiple-Robot Simultaneous Localization and Mapping: A Review". At a fundamental level, these mechanisms are often based on Bayes filters that check whether internal representations match reality or not. The deviation from reality may be referred to as the innovation. Internal representations are used in decision making if they match reality better than sensor readings. The opposite logic is also used-sensor readings are used in decision making if they are better match with reality than internal representations. This type of robustness also guards against disruptions in network QoS, as discussed in P. Schmuck and M. Chli, "CCM-SLAM: Robust and efficient centralized collaborative monocular simultaneous localization and mapping for robotic teams," Journal of Field Robotics, vol. 36, no. 4, pp. 763-781, 2019, doi: 10.1002/rob.21854.

The $5^{th}$ Generation (5G) system architecture from the $3^{rd}$ Generation Partnership Project (3GPP) specifies transport flow based QoS configurations called QoS Flows, as discussed in 3GPP TS 23.501 v 16.7.0, available at https://portal.3gpp.org/desktopmodules/Specifications/SpecificationDetails.aspx?specificationId=3144 as of 17 Dec. 2020. IP packets from applications are mapped to QoS flows in the UE or wireless device and network functions, such as the core network User Plane Function (UPF). Each QoS flow is associated with a 5G QoS Indicator (5QI) that encodes specific values to these service characteristics-resource type, priority, packet delay budget, packet error rate, averaging window, maximum data burst volume. Table 5.7.4 in 3GPP TS 23.501 sets out standard 5QI to service characteristics encodings (26 standard 5QIs as of August 2020) A copy of Table 5.7.4 is shown below as Table 1.

| 5QI Value | Resource Type | Default Priority Level | Packet Delay Budget (NOTE 3) | Packet Error Rate | Default Maximum Data Burst Volume (NOTE 2) | Default Averaging Window | Example Services |
|---|---|---|---|---|---|---|---|
| 1 | GBR (NOTE 1) | 20 | 100 ms (NOTE 11, NOTE 13) | $10^{-2}$ | N/A | 2000 ms | Conversational Voice |
| 2 | | 40 | 150 ms (NOTE 11, NOTE 13) | $10^{-3}$ | N/A | 2000 ms | Conversational Video (Live Streaming) |
| 3 | | 30 | 50 ms (NOTE 11, NOTE 13) | $10^{-3}$ | N/A | 2000 ms | Real Time Gaming, V2X messages (see TS 23.287 [121]). Electricity distribution - medium voltage, Process automation monitoring |
| 4 | | 50 | 300 ms (NOTE 11, NOTE 13) | $10^{-6}$ | N/A | 2000 ms | Non-Conversational Video (Buffered Streaming) |
| 65 (NOTE 9, NOTE 12) | | 7 | 75 ms (NOTE 7, NOTE 8) | $10^{-2}$ | N/A | 2000 ms | Mission Critical user plane Push To Talk voice (e.g., MCPTT) |
| 66 (NOTE 12) | | 20 | 100 ms (NOTE 10, NOTE 13) | $10^{-2}$ | N/A | 2000 ms | Non-Mission-Critical user plane Push To Talk voice |
| 67 (NOTE 12) | | 15 | 100 ms (NOTE 10, NOTE 13) | $10^{-3}$ | N/A | 2000 ms | Mission Critical Video user plane |
| 75 (NOTE 14) | | | | | | | |
| 71 | | 56 | 150 ms (NOTE 11, NOTE 13, NOTE 15) | $10^{-6}$ | N/A | 2000 ms | "Live" Uplink Streaming (e.g. TS 26.238 [76]) |
| 72 | | 56 | 300 ms (NOTE 11, NOTE 13, NOTE 15) | $10^{-4}$ | N/A | 2000 ms | "Live" Uplink Streaming (e.g. TS 26.238 [76]) |
| 73 | | 56 | 300 ms (NOTE 11, NOTE 13, NOTE 15) | $10^{-8}$ | N/A | 2000 ms | "Live" Uplink Streaming (e.g. TS 26.238 [76]) |
| 74 | | 56 | 500 ms (NOTE 11, NOTE 15) | $10^{-8}$ | N/A | 2000 ms | "Live" Uplink Streaming (e.g. TS 26.238 [76]) |
| 76 | | 56 | 500 ms (NOTE 11, NOTE 13, NOTE 15) | $10^{-4}$ | N/A | 2000 ms | "Live" Uplink Streaming (e.g. TS 26.238 [76]) |
| 5 | Non-GBR (NOTE 1) | 10 | 100 ms NOTE 10, NOTE 13) | $10^{-6}$ | N/A | N/A | IMS Signalling |
| 6 | | 60 | 300 ms (NOTE 10, NOTE 13) | $10^{-6}$ | N/A | N/A | Video (Buffered Streaming) TCP-based (e.g., www, e-mail, chat, ftp, p2p file sharing, progressive video, etc.) |
| 7 | | 70 | 100 ms (NOTE 10, NOTE 13) | $10^{-3}$ | N/A | N/A | Voice, Video (Live Streaming) Interactive Gaming |
| 8 | | 80 | 300 ms (NOTE 13) | $10^{-6}$ | N/A | N/A | Video (Buffered Streaming) TCP-based (e.g., www, e-mail, chat, ftp, p2p file sharing, progressive video, etc.) |
| 9 | | 90 | | | | | |
| 69 (NOTE 9, NOTE 12) | | 5 | 60 ms (NOTE 7, NOTE 8) | $10^{-6}$ | N/A | N/A | Mission Critical delay sensitive signalling (e.g., MC-PTT signalling) |
| 70 (NOTE 12) | | 55 | 200 ms (NOTE 7, NOTE 10) | $10^{-6}$ | N/A | N/A | Mission Critical Data (e.g. example services are the same as 5QI 6/8/9) |

-continued

| 5QI Value | Resource Type | Default Priority Level | Packet Delay Budget (NOTE 3) | Packet Error Rate | Default Maximum Data Burst Volume (NOTE 2) | Default Averaging Window | Example Services |
|---|---|---|---|---|---|---|---|
| 79 | | 65 | 50 ms (NOTE 10, NOTE 13) | $10^{-2}$ | N/A | N/A | V2X messages (see TS 23.287 [121]) |
| 80 | | 68 | 10 ms (NOTE 5, NOTE 10) | $10^{-6}$ | N/A | N/A | Low Latency eMBB applications Augmented Reality |
| 82 | Delay-critical GBR | 19 | 10 ms (NOTE 4) | $10^{-4}$ | 255 bytes | 2000 ms | Discrete Automation (see TS 22.261 [2]) |
| 83 | | 22 | 10 ms (NOTE 4) | $10^{-4}$ | 1354 bytes (NOTE 3) | 2000 ms | Discrete Automation (see TS 22.261 [2]); V2X messages (UE - RSU Platooning Advanced Driving: Cooperative Lane Change with low LoA. See TS 22.186 [111], TS 23.287 [121]) |
| 84 | | 24 | 30 ms (NOTE 6) | $10^{-5}$ | 1354 bytes (NOTE 3) | 2000 ms | Intelligent transport systems (see TS 22.261 [2]) |
| 85 | | 21 | 5 ms (NOTE 5) | $10^{-5}$ | 255 bytes | 2000 ms | Electricity Distribution-high voltage (see TS 22.261 [2]). V2X messages (Remote Driving. See TS 22.186 [111], NOTE 16, see TS 23.287 [121]) |
| 86 | | 18 | 5 ms (NOTE 5) | $10^{-4}$ | 1354 bytes | 2000 ms | V2X messages (Advanced Driving: Collision Avoidance, Platooning with high LoA. See TS 22.186 [111], TS 23.287 [121]) |

NOTE 1:
A packet which is delayed more than PDB is not counted as lost, thus not included in the PER.
NOTE 2:
It is required that default MDBV is supported by a PLMN supporting the related 5QIs.
NOTE 3:
The Maximum Transfer Unit (MTU) size considerations in clause 9.3 and Annex C of TS 23.060 [56] are also applicable. IP fragmentation may have impacts to CN PDB, and details are provided in clause 5.6.10.
NOTE 4:
A static value for the CN PDB of 1 ms for the delay between a UPF terminating N6 and a 5G-AN should be subtracted from a given PDB to derive the packet delay budget that applies to the radio interface. When a dynamic CN PDB is used, see clause 5.7.3.4.
NOTE 5:
A static value for the CN PDB of 2 ms for the delay between a UPF terminating N6 and a 5G-AN should be subtracted from a given PDB to derive the packet delay budget that applies to the radio interface. When a dynamic CN PDB is used, see clause 5.7.3.4.
NOTE 6:
A static value for the CN PDB of 5 ms for the delay between a UPF terminating N6 and a 5G-AN should be subtracted from a given PDB to derive the packet delay budget that applies to the radio interface. When a dynamic CN PDB is used, see clause 5.7.3.4.
NOTE 7:
For Mission Critical services, it may be assumed that the UPF terminating N6 is located "close" to the 5G_AN (roughly 10 ms) and is not normally used in a long distance, home routed roaming situation. Hence a static value for the CN PDBof 10 ms for the delay between a UPF terminating N6 and a 5G_AN should be subtracted from this PDB to derive the packet delay budget that applies to the radio interface.
NOTE 8:
In both RRC Idle and RRC Connected mode, the PDB requirement for these 5QIs can be relaxed (but not to a value greater than 320 ms) for the first packet(s) in a downlink data or signalling burst in order to permit reasonable battery saving (DRX) techniques.
NOTE 9:
It is expected that 5QI-65 and 5QI-69 are used together to provide Mission Critical Push to Talk service (e.g., 5QI-5 is not used for signalling). It is expected that the amount of traffic per UE will be similar or less compared to the IMS signalling.
NOTE 10:
In both RRC Idle and RRC Connected mode, the PDB requirement for these 5QIs can be relaxed for the first packet(s) in a downlink data or signalling burst in order to permit battery saving (DRX) techniques.
NOTE 11:
In RRC Idle mode, the PDB requirement for these 5QIs can be relaxed for the first packet(s) in a downlink data or signalling burst in order to permit battery saving (DRX) techniques.
NOTE 12:
This 5QI value can only be assigned upon request from the network side. The UE and any application running on the UE is not allowed to request this 5QI value.
NOTE 13:
A static value for the CN PDB of 20 ms for the delay between a UPF terminating N6 and a 5G-AN should be subtracted from a given PDB to derive the packet delay budget that applies to the radio interface.
NOTE 14:
This 5QI is not supported in this Release of the specification as it is only used for transmission of V2X messages over MBMS bearers as defined in TS 23.285 [72] but the value is reserved for future use.
NOTE 15:

| 5QI Value | Resource Type | Default Priority Level | Default Packet Delay Budget (NOTE 3) | Packet Error Rate | Default Maximum Data Burst Volume (NOTE 2) | Default Averaging Window | Example Services |
| --- | --- | --- | --- | --- | --- | --- | --- |

For "live" uplink streaming (see TS 26.238 [76]), guidelines for PDB values of the different 5QIs correspond to the latency configurations defined in TR 26.939 [77]. In order to support higher latency reliable streaming services (above 500 ms PDB), if different PDB and PER combinations are needed these configurations will have to use non-standardised 5QIs.
NOTE 16:
These services are expected to need much larger MDBV values to be signalled to the RAN. Support for such larger MDBV values with low latency and high reliability is likely to require a suitable RAN configuration, for which, the simulation scenarios in TR 38.824 [112] may contain some guidance.

Applications may specify the required 5QI to a control-plane component that selects QoS policies implemented by the User Plane Function (UPF). In some implementations, an Exposure Server (ES) as discussed in "Core Network Exposure", available at https://www.ericsson.com/en/portfolio/digital-services/cloud-core/cloud-unified-data-management-and-policy/core-network-exposure as of 17 Dec. 2020. The ES implements the Network Exposure Function (NEF).

5G systems may drop packets during undesirable conditions such as congestion, noisy channels, packet corruption, and so on. Packet-dropping decisions are specific to the Active Queue Management (AQM) technique used, as discussed in "Active Queue Management as Quality of Service Enabler for 5G Networks" by Irazabal, M. et al. 2019 European Conference on Networks and Communications (EuCNC), 421-426. Available at doi.org/10.1109/EuCNC.2019.8802027 as of 17 Dec. 2020. Packets are typically dropped based on network parameters (such as buffer lengths and packet flight times) and the QoS information carried by packets (such as Differentiated Services Code Point (DSCP)). Packets can also be inspected and classified using Deep Packet Inspection (DPI) techniques prior to dropping decisions. As an example of this, DPI may be used to read the Server Name Identifier (SNI) in Transport Layer Security (TLS) headers of packets.

US 2010/0238801 A1 discloses a method for controlling the quality of service for data communication. The method includes reviewing a timestamp of a data set, the timestamp having a time value. The time value may be the time the data set expires. Alternatively, the time value may be the time the data set was acquired. In yet another alternative, the time stamp may include both the time the data set expires and the time the data set was acquired. The method also includes determining if the time value of the time stamp is greater than the current time. If the time value is the time the data set expires and the time stamp is greater than the current time, the data set has become stale and is dropped.

U.S. Pat. No. 9,043,853 B2 discloses systems and methods for optimizing system performance of capacity and spectrum constrained multiple-access communication systems by selectively discarding packets. The systems and methods use control responses. One such control response includes the optimal discard (also referred to herein as "intelligent discard") of network packets under capacity constrained conditions. Some embodiments inspect a video stream to determine priorities for various elements of the video stream. The elements may be discarded using the priorities. In various embodiments, the elements include frames, slices, macroblocks, and data partitions.

SUMMARY

It is an object of the present disclosure to provide methods and apparatus for packet processing that support intelligent packet dropping, such that packets (such as irrelevant packets) may be dropped without significant performance loss. Dropping packets that are irrelevant may allow savings in the energy used for transmission, reception, and deserialization/serialization of packets.

Embodiments of the disclosure aim to provide methods and apparatus that alleviate some or all of the challenges identified herein.

An embodiment of the disclosure provides a method performed by a subscriber wireless device for packet processing. The method comprises retrieving message profile information relating to the subscriber wireless device, wherein the message profile information indicates publish-subscribe applications executed by the subscriber wireless device. The method further comprises profiling publish-subscribe applications executed by the subscriber wireless device to determine message processing statistics, and initiating transmission of message processing information relating to the publish-subscribe applications executed by the subscriber wireless device to a network function.

A further embodiment of the disclosure provides a method performed by a network function (which may be hosted in a core network node) for packet processing. The method comprises receiving message processing information relating to one or more publish-subscribe applications executed by one or more subscriber wireless devices. The method further comprises causing a packet dropping task to be initiated to handle packets for each of the one or more publish-subscribe applications executed by the subscriber wireless devices, wherein each packet dropping task processes packets directed towards a given publish-subscribe application from among the one or more publish-subscribe applications, and wherein the processing performed by each packet dropping task comprises retaining packets directed towards the given publish-subscribe application in a task-side message buffer until a task-side message buffer capacity is reached and discarding packets directed towards the given publish-subscribe application when the task-side message buffer capacity has been reached. The method also comprises initiating transmission of the packets in the task-side message buffer towards one or more publish-subscribe applications.

A further embodiment of the disclosure provides a subscriber wireless device for packet processing. The subscriber wireless device comprises processing circuitry configured to cause the subscriber wireless device to retrieve message profile information relating to the subscriber wireless device, wherein the message profile information indicates publish-subscribe applications executed by the subscriber wireless device. The processing circuitry is further configured to cause the subscriber wireless device to profile publish-subscribe applications executed by the subscriber wireless device to determine message processing statistics, and initiate transmission of message processing information relating to the publish-subscribe applications executed by the subscriber wireless device to a network function. The subscriber wireless device further comprises power supply circuitry configured to supply power to the subscriber wireless device.

A further embodiment of the disclosure provides a core network node configured to execute a network function for packet processing. The core network node comprises processing circuitry configured to execute the network function step of receiving message processing information relating to one or more publish-subscribe applications executed by one or more subscriber wireless devices. The processing circuitry is further configured to execute the network function step of causing a packet dropping task to be initiated to handle packets for each of the one or more publish-subscribe applications executed by the subscriber wireless devices, wherein each packet dropping task processes packets directed towards a given publish-subscribe application from among the one or more publish-subscribe applications, and wherein the processing performed by each packet dropping task comprises retaining packets directed towards the given publish-subscribe application in a task-side message buffer until a task-side message buffer capacity is reached and discarding packets directed towards the given publish-subscribe application when the task-side message buffer capacity has been reached. The processing circuitry is further configured to execute the network function step of initiating transmission of the packets in the task-side message buffer towards one or more publish-subscribe applications. The core network node further comprises power supply circuitry configured to supply power to the core network node.

Further embodiments of the disclosure provide communication systems comprising one or both of the subscriber wireless device and core network node, and/or configured to perform methods in accordance with embodiments.

BRIEF DESCRIPTION OF DRAWINGS

For better understanding of the present disclosure, and to show how it may be put into effect, reference will now be made, by way of example only, to the accompanying drawings, in which.

Figure 1:
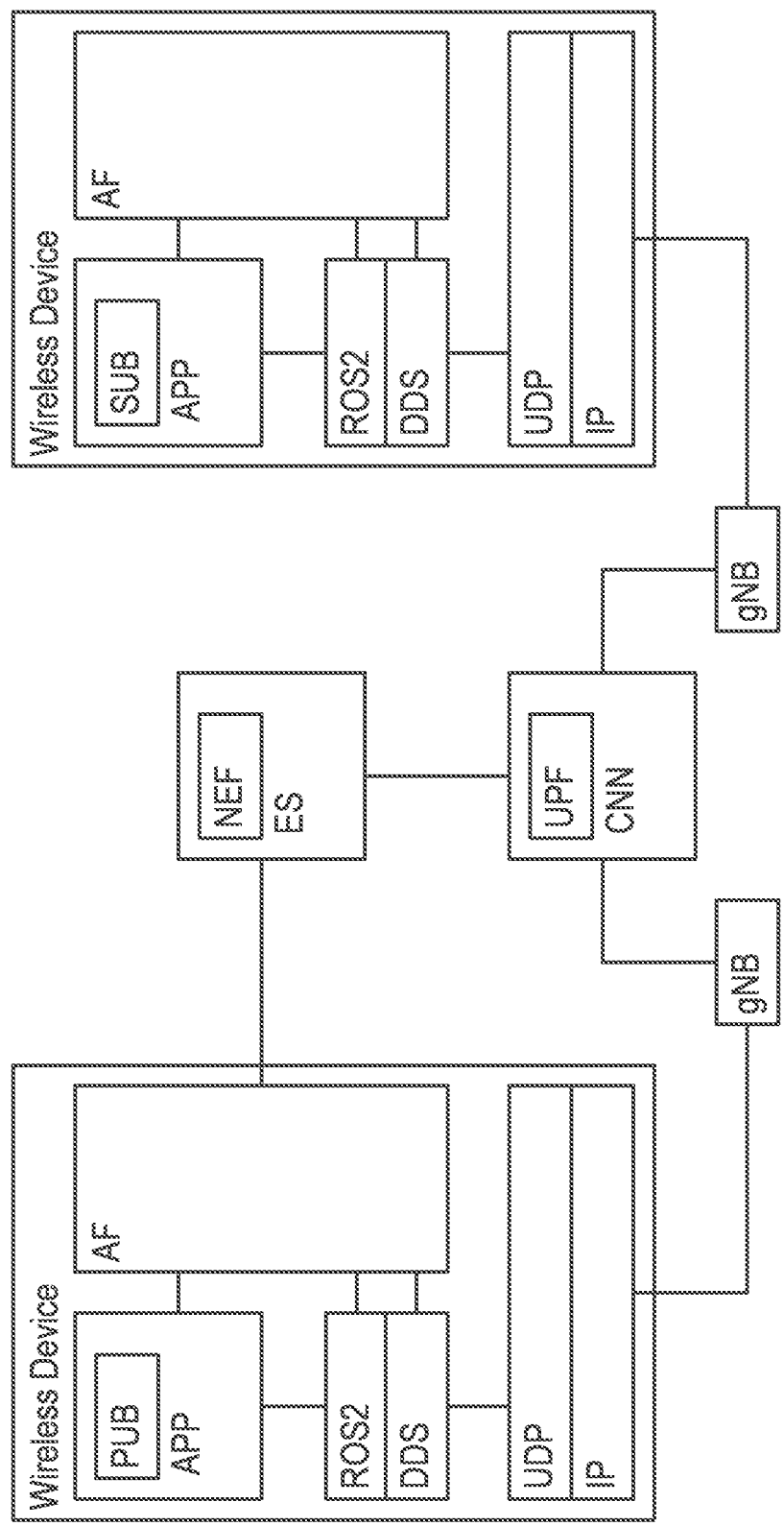
FIG. 1 is a diagram of a publisher-subscriber pair in accordance with some embodiments.

Certain aspects of the present disclosure and their embodiments may provide solutions to these or other challenges. The packets of messages that are going to be overwritten, for example, by the ROS2 or DDS systems can be dropped by the 5G system without performance loss. Such selective dropping saves energy required for transmission, reception, and deserialization/serialization of packets. Aspects of embodiments may provide an application-aware packet-dropping method for 5G systems that selects packets of messages that are going to be overwritten at the subscriber-side, for example, in mobile robotics applications built with ROS2 or DDS. The intelligence behind dropping packets relies on packet inspection at the network function side (for example UPF-side) and subscriber profiling and validation of dropping decisions at the subscriber-side. The network can drop packets selectively by exploiting, for example, the History QoS policy of ROS2 or DDS systems. Mobile robot applications are typically interested in the most recent messages. Energy is saved by not transmitting irrelevant messages on the network side and by not de/serializing irrelevant messages in the mobile robot-side (i.e., subscriber-side).

There are, proposed herein, various embodiments which address one or more of the issues disclosed herein.

Aspects of embodiments may provide methods performed by subscriber wireless devices for packet processing, the methods comprising:
Retrieving message profile information relating to the subscriber wireless device, wherein the message profile information indicates publish-subscribe applications executed by the subscriber wireless device;
Profiling publish-subscribe applications executed by the subscriber wireless device to determine message processing statistics; and
Initiating transmission of message processing information relating to the publish-subscribe applications executed by the subscriber wireless device to a network function.

Further aspects of embodiments may provide methods performed by a network functions (for example, hosted by core network nodes) for packet processing, the methods comprising:
receiving message processing information relating to one or more publish-applications executed by one or more subscriber wireless devices;
causing a packet dropping task to be initiated to handle packets for each of the one or more publish-subscribe applications executed by the subscriber wireless devices, wherein each packet dropping task processes packets directed towards a given publish-subscribe application from among the one or more publish-subscribe applications, and wherein the processing performed by each packet dropping task comprises retaining packets directed towards the given Publish-subscribe application in a task-side message buffer until a task-side message buffer capacity is reached and discarding packets directed towards the given Publish-subscribe application when the task-side message buffer capacity has been reached; and initiating transmission of the packets in the task-side message buffer towards one or more publish-subscribe applications.

Certain embodiments may provide one or more of the following technical advantage(s).

Packets may be intelligently dropped without performance loss.

Energy may be saved proportional to size of messages whose packets are dropped.

Energy required for transmission, reception, and deserialization may be saved.

ADDITIONAL EXPLANATION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

System Overview

Aspects of embodiments may be implemented in a system comprising a 5G system with a 5G Radio Access Network (RAN) and 5G Core Network (CN). The 5G RAN may comprise one or more 5G base stations (gNB). The 5G CN may host a User Plane Function (UPF) and may comprise an Exposure Server (ES) that implements a NEF (the ES may be hosted separately from the UPF). Two or more Wireless Devices (WD, also referred to as User Equipments UE) may be connected to the 5G network. In some aspects of embodiments, the UEs are 5GS-specific components in mobile robots. Application Functions (AF) specific to publisher-subscriber applications (which may be ROS2 or DDS applications) may be installed on each of the UEs. ROS2 or DDS applications may be executed on UEs with one or more matched publisher-subscriber pairs. A matched publisher-subscriber pair is a publisher and subscriber who are able to communicate with each other because their topics and QoS settings are compatible. An example system is illustrated in FIG. 1.

An intelligent packet-dropping method for ROS2 and DDS applications according to aspects of embodiments may function as follows. Methods according to aspects of embodiments may rely on one or more of the following 5 assumptions:

1 the decision to overwrite messages in a subscriber's message buffer may be taken solely by a ROS2 or DDS system at the subscriber-side;
2 the ROS2 or DDS system at the publisher-side may not pre-emptively abort sending messages after inferring subscriber drain actions (for example, via tight-coupling or guesswork);
3 the subscriber may drain its message buffer fully during each drain operation;
4 the message buffer may be closed to new messages while it is being drained by the subscriber; and
5 the mobile robotics application hosting the subscriber may be robust towards network service disruptions.

Although some or all of the above 5 assumptions may not be accurate for all aspects of embodiments, the operation of the system may be improved where the assumptions are correct. Further, target subscribers may be publish-subscribe (potentially ROS2 or DDS) applications with history QoS policy set to less than a pre-defined threshold. The history QoS policy threshold can be set as an ES-specific configuration variable during network planning for all ROS2 and DDS applications or it could be programmed per flow, for example, using a special NEF Application Program Interface (API).

Figure 2:
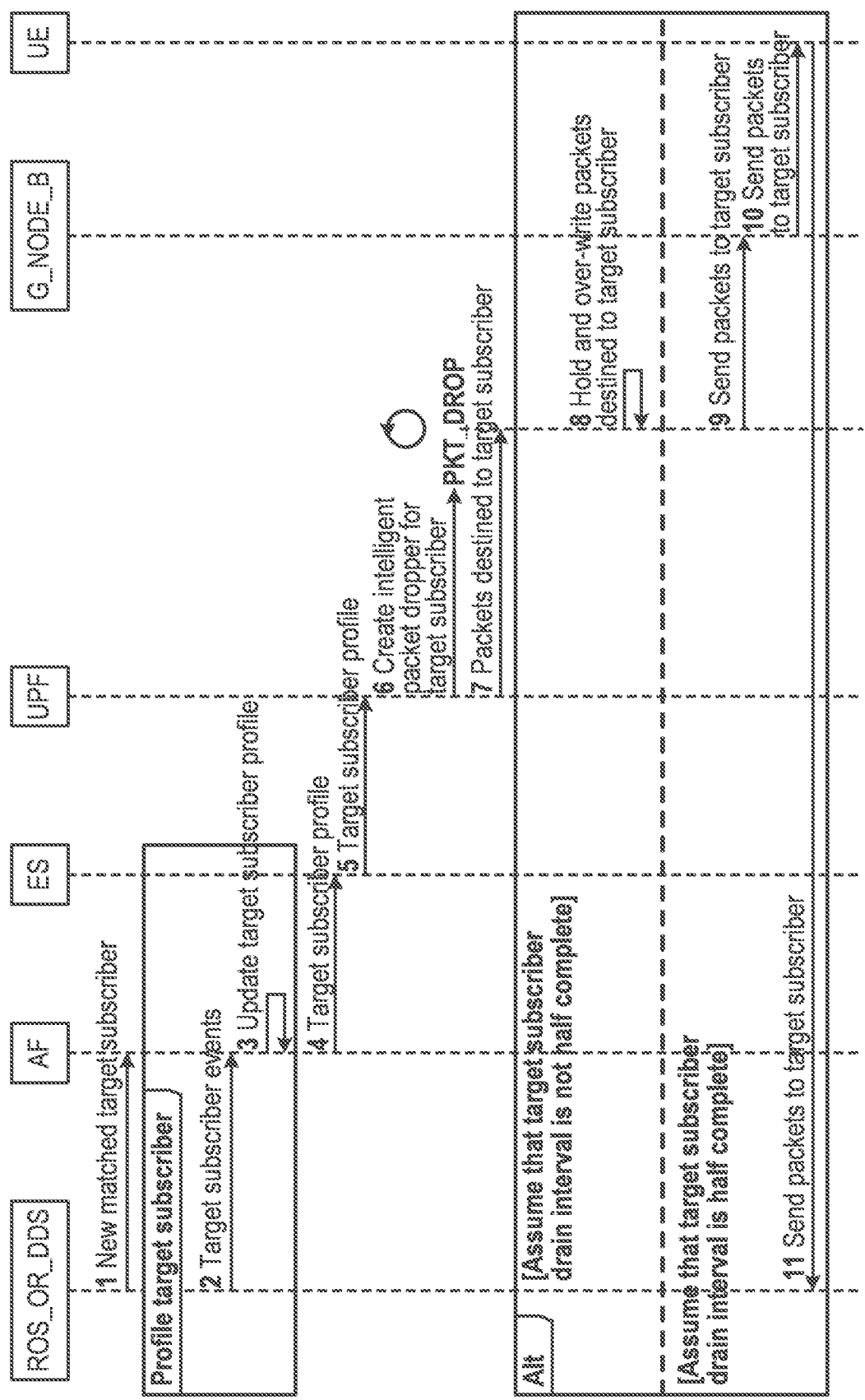
FIG. 2 is a sequence diagram illustrating operations in accordance with some embodiments.

A sequence diagram illustrating operations in accordance with aspects of embodiments is shown in FIG. 2.

In step 1 of FIG. 2, the ROS2 or DDS systems notifies the AF about matched target subscribers under its control. The AF may be provided with one or more of the history QoS policy, message structure details of target subscribers and a profiling function per target subscriber.

In steps 2 and 3 of FIG. 2, the AF invokes the profiling functions to determine message processing statistics for the target subscribers, such as message delays and message buffer drain intervals of target subscribers. The AF then updates the target subscriber profile accordingly. The message delays may include message UE ingress processing delays, which are the time taken for a message to travel from the farthest ingress point in the UE until arriving at the buffer of the subscriber, that is, the delay incurred in processing subscriber messages on the UE. The message buffer drain interval is a measure reflecting how often the subscriber takes out (drains) all messages from the message buffer. This quantifies the scheduling of the subscriber process.

In step 4 and 5 the message processing information relating to the publish-subscribe applications is transmitted to a network function. In the aspect of an embodiment shown in FIG. 2, the network function is a UPF and the AF periodically communicates with the UPF via the ES, the message processing information including the history QoS policy settings, message structures, message arrival delay statistics and message buffer drain statistics of target subscribers. The ES in turn relays the same information to the UPF.

In step 6, for each target subscriber, the UPF starts a packet-dropping task that processes packets destined to the target subscriber. The packet-dropping task is not synchronized with the target subscriber. If there are several target subscribers in the same ROS2 or DDS system that subscribe to the same topic and served by the same QoS flow (that is, are receiving packets from the same source or sources, then the UPF starts off one packet-dropping task that caters to all of them. The packet-dropping task identifies messages contained in the packets using message structure information. It holds the messages in a circular message buffer for a duration T, as shown in step 8. The task-side message buffer may be determined for each publish subscribe application, based on history QoS policy setting, in particular, the task-side message buffer may utilise the same capacity as the subscriber-side message buffer determined by the history of the subscriber. New messages may overwrite old messages in the task-side message buffer mimicking subscriber-side overwriting. After duration T has elapsed, then the messages in the task-side message buffer are sent to the target subscriber, as shown in steps 9, 10 and 11.

The message hold duration T may be determined individually for each publish-subscribe application, in particular, may be set to half of the target subscriber's message buffer drain interval as a default. The message hold duration T can be set to a custom value during network planning for all ROS2 and DDS applications or it could be programmed per flow (for example, using a special NEF API). Setting the message hold duration T is a tradeoff between (1) delaying packets long enough so that most irrelevant packets can be dropped and (2) sending packets quickly enough so that target subscriber does not experience a delay in message reception. The duration from the point in time a message is entering the UPF circular buffer until it arrives at the subscriber-side message buffer is bound by the sum of the hold duration T, the message UE ingress processing delay (profiled by the AF) and the message transit delay through the RAN and core network (known to the UPF). If the messages sent by packet-dropping task miss the assumed drain at the subscriber-side and must wait for the next drain operation, this is typically not problematic as many applications, such as mobile robot applications, are tolerant to network service disruptions. When multiple publishers publish messages to a target subscriber, then intelligent packet dropping does not discriminate between the messages of the publishers. If there are several target subscribers that subscribe to the same topic, then the packet-side message buffer has the same capacity as the target subscriber with the largest message buffer i.e., largest QoS history setting. The hold duration T may be accurately calculated for just in-time release of messages such that they are immediately drained at the subscriber-side. Time synchronization between the UPF and the subscriber using NTP or PTP can be leveraged to achieve accurate timing of the holding to packets in the UPF and the draining of the message buffer by the subscriber. However, this requires tighter coupling between the packet-dropping task and the target subscriber.

Implementation

Aspects of embodiments may be implemented using existing technology, custom extensions, and new technology in the context of UE, AF, ES, UPF, ROS2 and DDS, as will be known to those skilled in the art. Some examples of implementation options are as follows. An AF for ROS2 and DDS applications based on templates of existing application functions may be used. Communication between the AF and ROS2 or DDS system may use custom extensions to ROS2 or DDS. Profiling of target subscribers in the ROS2 or DDS system may be done by existing full-system dynamic instrumentation techniques such as LTTng (as discussed in "LTTng: an open source tracing framework for Linux", available at lttng.org as of 17 Dec. 2020). Identification of packets belonging to target subscribers may be done using IP flows notified by the application function on the publisher-side to the NEF or through pre-decided Differential Services Code Point (DSCP) values in headers of packets of published messages. DPI may be used for isolation of irrelevant messages. Communication of target subscriber information between AF and ES may be done via custom extensions for the ES. All computation performed by the UPF may be achieved through custom extensions in appropriate components of the 5G core network.

In some embodiments, the network function functionality described herein can be performed by hardware. Thus, in some embodiments, the network function described herein can be a hardware entity, or can be hosted by a hardware entity (such as a CNN). However, it will also be understood that optionally at least part or all of the entity functionality described herein can be virtualized. For example, the functions performed by the network function described herein can be implemented in software running on generic hardware that is configured to orchestrate the entity functionality. Thus, in some embodiments, the network function described herein can be a virtual entity. In some embodiments, at least part or all of the network function functionality described herein may be performed in a network enabled cloud. The network function functionality described herein may all be at the same location or at least some of the entity functionality may be distributed.

Figure 3:
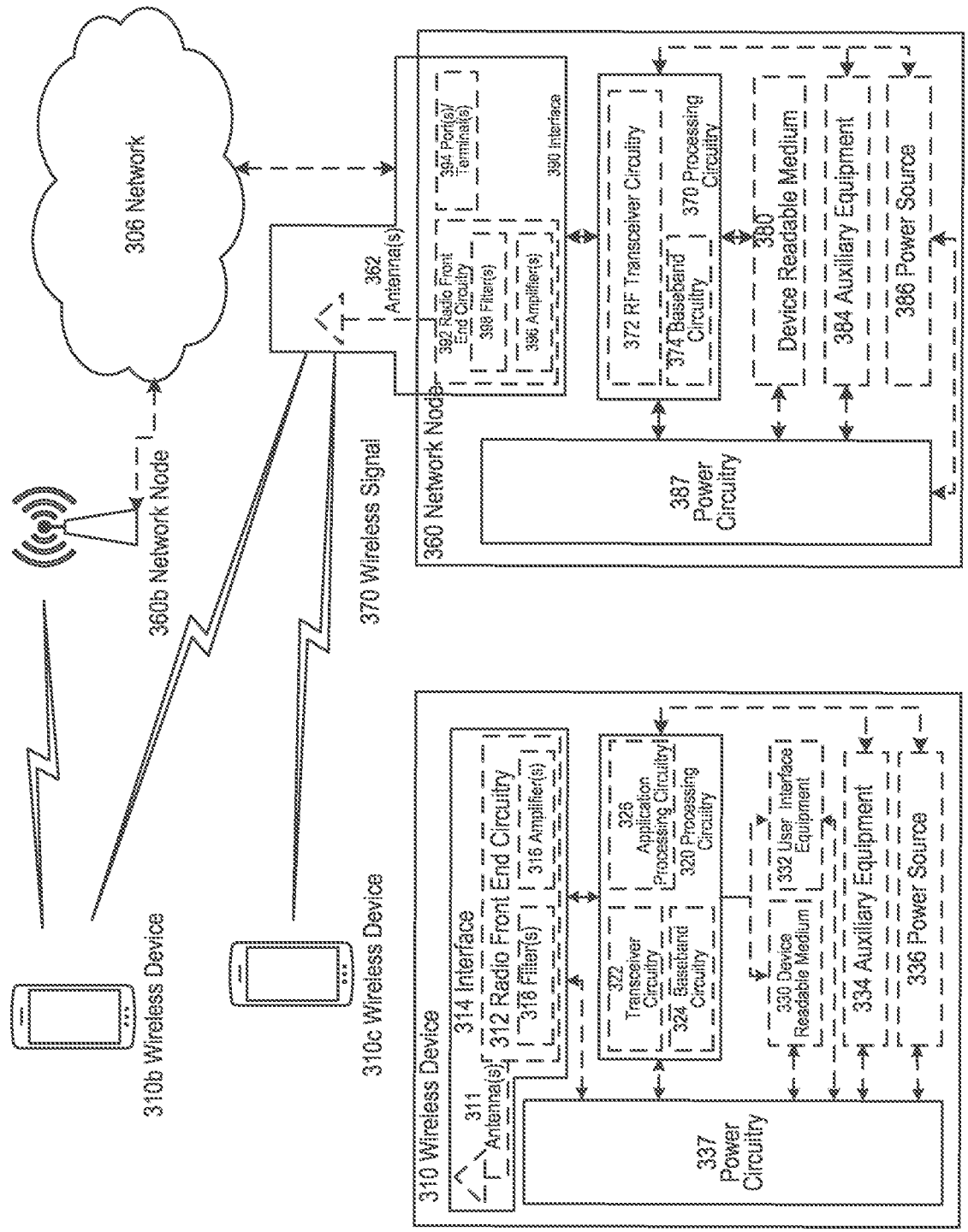
FIG. 3 is a schematic diagram of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 306, network nodes 360 and 360b, and WDs 310, 310b, and 310c (which may be wireless devices in accordance with aspects of embodiments). In practice, a wireless network may further include any additional elements suitable to support communication between wireless devices or between a wireless device and another communication device, such as a landline telephone, a service provider, a core network node, or any other network node or end device. Of the illustrated components, network node 360 and wireless device (WD) 310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 306 may comprise one or more backhaul networks, core networks (including core network nodes hosting network functions according to aspects of embodiments), IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 360 and WD 310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 360 includes processing circuitry 370, device readable medium 380, interface 390, auxiliary equipment 384, power source 386, power circuitry 387, and antenna 362. Although network node 360 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 360 are depicted as single boxes located within a larger box, or nested within multiple boxes, in practice, a network node may comprise multiple different physical components that make up a single illustrated component (e.g., device readable medium 380 may comprise multiple separate hard drives as well as multiple RAM modules).

Similarly, network node 360 may be composed of multiple physically separate components (e.g., a NodeB component and a RNC component, or a BTS component and a BSC component, etc.), which may each have their own respective components. In certain scenarios in which network node 360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 360 may be configured to support multiple radio access technologies (RATs). In such embodiments, some components may be duplicated (e.g., separate device readable medium 380 for the different RATs) and some components may be reused (e.g., the same antenna 362 may be shared by the RATs). Network node 360 may also include multiple sets of the various illustrated components for different wireless technologies integrated into network node 360, such as, for example, GSM, WCDMA, LTE, NR, WiFi, or Bluetooth wireless technologies. These wireless technologies may be integrated into the same or different chip or set of chips and other components within network node 360.

Processing circuitry 370 is configured to perform any determining, calculating, or similar operations (e.g., certain obtaining operations) described herein as being provided by a network node. These operations performed by processing circuitry 370 may include processing information obtained by processing circuitry 370 by, for example, converting the obtained information into other information, comparing the obtained information or converted information to information stored in the network node, and/or performing one or more operations based on the obtained information or converted information, and as a result of said processing making a determination.

Processing circuitry 370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 360 components, such as device readable medium 380, network node 360 functionality. For example, processing circuitry 370 may execute instructions stored in device readable medium 380 or in memory within processing circuitry 370. Such functionality may include providing any of the various wireless features, functions, or benefits discussed herein. In some embodiments, processing circuitry 370 may include a system on a chip (SOC).

In some embodiments, processing circuitry 370 may include one or more of radio frequency (RF) transceiver circuitry 372 and baseband processing circuitry 374. In some embodiments, radio frequency (RF) transceiver circuitry 372 and baseband processing circuitry 374 may be on separate chips (or sets of chips), boards, or units, such as radio units and digital units. In alternative embodiments, part or all of RF transceiver circuitry 372 and baseband processing circuitry 374 may be on the same chip or set of chips, boards, or units In certain embodiments, some or all of the functionality described herein as being provided by a network node, base station, eNB or other such network device may be performed by processing circuitry 370 executing instructions stored on device readable medium 380 or memory within processing circuitry 370. In alternative embodiments, some or all of the functionality may be provided by processing circuitry 370 without executing instructions stored on a separate or discrete device readable medium, such as in a hard-wired manner. In any of those embodiments, whether executing instructions stored on a device readable storage medium or not, processing circuitry 370 can be configured to perform the described functionality. The benefits provided by such functionality are not limited to processing circuitry 370 alone or to other components of network node 360, but are enjoyed by network node 360 as a whole, and/or by end users and the wireless network generally.

Device readable medium 380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 370. Device readable medium 380 may store any suitable instructions, data or information, including a computer program, software, an application including one or more of logic, rules, code, tables, etc. and/or other instructions capable of being executed by processing circuitry 370 and, utilized by network node 360. Device readable medium 380 may be used to store any calculations made by processing circuitry 370 and/or any data received via interface 390. In some embodiments, processing circuitry 370 and device readable medium 380 may be considered to be integrated.

Interface 390 is used in the wired or wireless communication of signalling and/or data between network node 360, network 306, and/or WDs 310. As illustrated, interface 390 comprises port(s)/terminal(s) 394 to send and receive data, for example to and from network 306 over a wired connection. Interface 390 also includes radio front end circuitry 392 that may be coupled to, or in certain embodiments a part of, antenna 362. Radio front end circuitry 392 comprises filters 398 and amplifiers 396. Radio front end circuitry 392 may be connected to antenna 362 and processing circuitry 370. Radio front end circuitry may be configured to condition signals communicated between antenna 362 and processing circuitry 370. Radio front end circuitry 392 may receive digital data that is to be sent out to other network nodes or WDs via a wireless connection. Radio front end circuitry 392 may convert the digital data into a radio signal having the appropriate channel and bandwidth parameters using a combination of filters 398 and/or amplifiers 396. The radio signal may then be transmitted via antenna 362. Similarly, when receiving data, antenna 362 may collect radio signals which are then converted into digital data by radio front end circuitry 392. The digital data may be passed to processing circuitry 370. In other embodiments, the interface may comprise different components and/or different combinations of components.

In certain alternative embodiments, network node 360 may not include separate radio front end circuitry 392, instead, processing circuitry 370 may comprise radio front end circuitry and may be connected to antenna 362 without separate radio front end circuitry 392. Similarly, in some embodiments, all or some of RF transceiver circuitry 372 may be considered a part of interface 390. In still other embodiments, interface 390 may include one or more ports or terminals 394, radio front end circuitry 392, and RF transceiver circuitry 372, as part of a radio unit (not shown), and interface 390 may communicate with baseband processing circuitry 374, which is part of a digital unit (not shown).

Antenna 362 may include one or more antennas, or antenna arrays, configured to send and/or receive wireless signals. Antenna 362 may be coupled to radio front end circuitry 390 and may be any type of antenna capable of transmitting and receiving data and/or signals wirelessly. In some embodiments, antenna 362 may comprise one or more omni-directional, sector or panel antennas operable to transmit/receive radio signals between, for example, 2 GHZ and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 362 may be separate from network node 360 and may be connectable to network node 360 through an interface or port.

Antenna 362, interface 390, and/or processing circuitry 370 may be configured to perform any receiving operations and/or certain obtaining operations described herein as being performed by a network node. Any information, data and/or signals may be received from a wireless device, another network node and/or any other network equipment. Similarly, antenna 362, interface 390, and/or processing circuitry 370 may be configured to perform any transmitting operations described herein as being performed by a network node. Any information, data and/or signals may be transmitted to a wireless device, another network node and/or any other network equipment.

Power circuitry 387 may comprise, or be coupled to, power management circuitry and is configured to supply the components of network node 360 with power for performing the functionality described herein. Power circuitry 387 may receive power from power source 386. Power source 386 and/or power circuitry 387 may be configured to provide power to the various components of network node 360 in a form suitable for the respective components (e.g., at a voltage and current level needed for each respective component). Power source 386 may either be included in, or external to, power circuitry 387 and/or network node 360. For example, network node 360 may be connectable to an external power source (e.g., an electricity outlet) via an input circuitry or interface such as an electrical cable, whereby the external power source supplies power to power circuitry 387. As a further example, power source 386 may comprise a source of power in the form of a battery or battery pack which is connected to, or integrated in, power circuitry 387. The battery may provide backup power should the external power source fail. Other types of power sources, such as photovoltaic devices, may also be used.

Alternative embodiments of network node 360 may include additional components beyond those shown in FIG. 3 that may be responsible for providing certain aspects of the network node's functionality, including any of the functionality described herein and/or any functionality necessary to support the subject matter described herein. For example, network node 360 may include user interface equipment to allow input of information into network node 360 and to allow output of information from network node 360. This may allow a user to perform diagnostic, maintenance, repair, and other administrative functions for network node 360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. . . . A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 310 includes antenna 311, interface 314, processing circuitry 320, device readable medium 330, user interface equipment 332, auxiliary equipment 334, power source 336 and power circuitry 337. WD 310 may include multiple sets of one or more of the illustrated components for different wireless technologies supported by WD 310, such as, for example, GSM, WCDMA, LTE, NR, WiFi, WiMAX, or Bluetooth wireless technologies, just to mention a few. These wireless technologies may be integrated into the same or different chips or set of chips as other components within WD 310.

Antenna 311 may include one or more antennas or antenna arrays, configured to send and/or receive wireless signals, and is connected to interface 314. In certain alternative embodiments, antenna 311 may be separate from WD 310 and be connectable to WD 310 through an interface or port. Antenna 311, interface 314, and/or processing circuitry 320 may be configured to perform any receiving or transmitting operations described herein as being performed by a WD. Any information, data and/or signals may be received from a network node and/or another WD. In some embodiments, radio front end circuitry and/or antenna 311 may be considered an interface.

As illustrated, interface 314 comprises radio front end circuitry 312 and antenna 311. Radio front end circuitry 312 comprise one or more filters 318 and amplifiers 316. Radio front end circuitry 314 is connected to antenna 311 and processing circuitry 320, and is configured to condition signals communicated between antenna 311 and processing circuitry 320. Radio front end circuitry 312 may be coupled to or a part of antenna 311. In some embodiments, WD 310 may not include separate radio front end circuitry 312; rather, processing circuitry 320 may comprise radio front end circuitry and may be connected to antenna 311. Similarly, in some embodiments, some or all of RF transceiver circuitry 322 may be considered a part of interface 314. Radio front end circuitry 312 may receive digital data that is to be sent out to other network nodes or WDs via a wireless connection. Radio front end circuitry 312 may convert the digital data into a radio signal having the appropriate channel and bandwidth parameters using a combination of filters 318 and/or amplifiers 316. The radio signal may then be transmitted via antenna 311. Similarly, when receiving data, antenna 311 may collect radio signals which are then converted into digital data by radio front end circuitry 312. The digital data may be passed to processing circuitry 320. In other embodiments, the interface may comprise different components and/or different combinations of components.

Processing circuitry 320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 310 components, such as device readable medium 330, WD 310 functionality. Such functionality may include providing any of the various wireless features or benefits discussed herein. For example, processing circuitry 320 may execute instructions stored in device readable medium 330 or in memory within processing circuitry 320 to provide the functionality disclosed herein.

As illustrated, processing circuitry 320 includes one or more of RF transceiver circuitry 322, baseband processing circuitry 324, and application processing circuitry 326. In other embodiments, the processing circuitry may comprise different components and/or different combinations of components. In certain embodiments processing circuitry 320 of WD 310 may comprise a SOC. In some embodiments, RF transceiver circuitry 322, baseband processing circuitry 324, and application processing circuitry 326 may be on separate chips or sets of chips. In alternative embodiments, part or all of baseband processing circuitry 324 and application processing circuitry 326 may be combined into one chip or set of chips, and RF transceiver circuitry 322 may be on a separate chip or set of chips. In still alternative embodiments, part or all of RF transceiver circuitry 322 and baseband processing circuitry 324 may be on the same chip or set of chips, and application processing circuitry 326 may be on a separate chip or set of chips. In yet other alternative embodiments, part or all of RF transceiver circuitry 322, baseband processing circuitry 324, and application processing circuitry 326 may be combined in the same chip or set of chips. In some embodiments, RF transceiver circuitry 322 may be a part of interface 314. RF transceiver circuitry 322 may condition RF signals for processing circuitry 320.

In certain embodiments, some or all of the functionality described herein as being performed by a WD may be provided by processing circuitry 320 executing instructions stored on device readable medium 330, which in certain embodiments may be a computer-readable storage medium. In alternative embodiments, some or all of the functionality may be provided by processing circuitry 320 without executing instructions stored on a separate or discrete device readable storage medium, such as in a hard-wired manner. In any of those particular embodiments, whether executing instructions stored on a device readable storage medium or not, processing circuitry 320 can be configured to perform the described functionality. The benefits provided by such functionality are not limited to processing circuitry 320 alone or to other components of WD 310, but are enjoyed by WD 310 as a whole, and/or by end users and the wireless network generally.

Processing circuitry 320 may be configured to perform any determining, calculating, or similar operations (e.g., certain obtaining operations) described herein as being performed by a WD. These operations, as performed by processing circuitry 320, may include processing information obtained by processing circuitry 320 by, for example, converting the obtained information into other information, comparing the obtained information or converted information to information stored by WD 310, and/or performing one or more operations based on the obtained information or converted information, and as a result of said processing making a determination.

Device readable medium 330 may be operable to store a computer program, software, an application including one or more of logic, rules, code, tables, etc. and/or other instructions capable of being executed by processing circuitry 320. Device readable medium 330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD), and/or any other volatile or non-volatile, non-transitory device readable and/or computer executable memory devices that store information, data, and/or instructions that may be used by processing circuitry 320. In some embodiments, processing circuitry 320 and device readable medium 330 may be considered to be integrated.

User interface equipment 332 may provide components that allow for a human user to interact with WD 310. Such interaction may be of many forms, such as visual, audial, tactile, etc. User interface equipment 332 may be operable to produce output to the user and to allow the user to provide input to WD 310. The type of interaction may vary depending on the type of user interface equipment 332 installed in WD 310. For example, if WD 310 is a smart phone, the interaction may be via a touch screen; if WD 310 is a smart meter, the interaction may be through a screen that provides usage (e.g., the number of gallons used) or a speaker that provides an audible alert (e.g., if smoke is detected). User interface equipment 332 may include input interfaces, devices and circuits, and output interfaces, devices and circuits. User interface equipment 332 is configured to allow input of information into WD 310, and is connected to processing circuitry 320 to allow processing circuitry 320 to process the input information. User interface equipment 332 may include, for example, a microphone, a proximity or other sensor, keys/buttons, a touch display, one or more cameras, a USB port, or other input circuitry. User interface equipment 332 is also configured to allow output of information from WD 310, and to allow processing circuitry 320 to output information from WD 310. User interface equipment 332 may include, for example, a speaker, a display, vibrating circuitry, a USB port, a headphone interface, or other output circuitry. Using one or more input and output interfaces, devices, and circuits, of user interface equipment 332, WD 310 may communicate with end users and/or the wireless network, and allow them to benefit from the functionality described herein.

Auxiliary equipment 334 is operable to provide more specific functionality which may not be generally performed by WDs. This may comprise specialized sensors for doing measurements for various purposes, interfaces for additional types of communication such as wired communications etc. The inclusion and type of components of auxiliary equipment 334 may vary depending on the embodiment and/or scenario.

Power source 336 may, in some embodiments, be in the form of a battery or battery pack. Other types of power sources, such as an external power source (e.g., an electricity outlet), photovoltaic devices or power cells, may also be used. WD 310 may further comprise power circuitry 337 for delivering power from power source 336 to the various parts of WD 310 which need power from power source 336 to carry out any functionality described or indicated herein. Power circuitry 337 may in certain embodiments comprise power management circuitry. Power circuitry 337 may additionally or alternatively be operable to receive power from an external power source; in which case WD 310 may be connectable to the external power source (such as an electricity outlet) via input circuitry or an interface such as an electrical power cable. Power circuitry 337 may also in certain embodiments be operable to deliver power from an external power source to power source 336. This may be, for example, for the charging of power source 336. Power circuitry 337 may perform any formatting, converting, or other modification to the power from power source 336 to make the power suitable for the respective components of WD 310 to which power is supplied.

Figure 4:
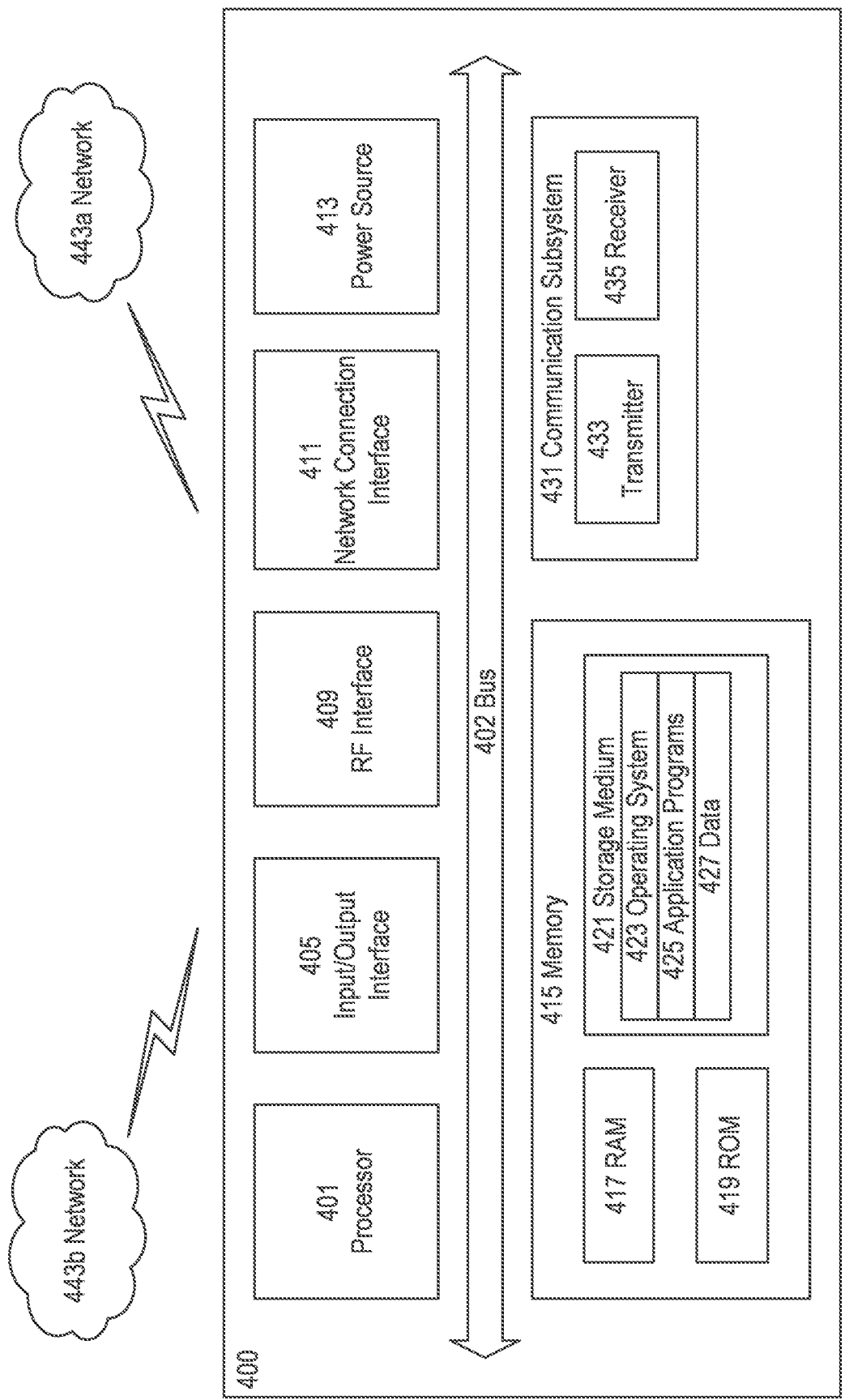
FIG. 4 is a schematic diagram of a user equipment in accordance with some embodiments.

FIG. 4 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 400 may be any UE identified by the $3^{rd}$ Generation Partnership Project (3GPP), including a NB-IoT UE, a machine type communication (MTC) UE, and/or an enhanced MTC (eMTC) UE. UE 400, as illustrated in FIG. 4, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 4 is a UE, the components discussed herein are equally applicable to a WD, and vice-versa.

In FIG. 4, UE 400 includes processing circuitry 401 that is operatively coupled to input/output interface 405, radio frequency (RF) interface 409, network connection interface 411, memory 415 including random access memory (RAM) 417, read-only memory (ROM) 419, and storage medium 421 or the like, communication subsystem 431, power source 433, and/or any other component, or any combination thereof. Storage medium 421 includes operating system 423, application program 425, and data 427. In other embodiments, storage medium 421 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 401 may be configured to process computer instructions and data. Processing circuitry 401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 401 may include two central processing units (CPUs). Data may be information in a form suitable for use by a computer.

In the depicted embodiment, input/output interface 405 may be configured to provide a communication interface to an input device, output device, or input and output device. UE 400 may be configured to use an output device via input/output interface 405. An output device may use the same type of interface port as an input device. For example, a USB port may be used to provide input to and output from UE 400. The output device may be a speaker, a sound card, a video card, a display, a monitor, a printer, an actuator, an emitter, a smartcard, another output device, or any combination thereof. UE 400 may be configured to use an input device via input/output interface 405 to allow a user to capture information into UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 409 may be configured to provide a communication interface to RF components such as a transmitter, a receiver, and an antenna. Network connection interface 411 may be configured to provide a communication interface to network 443a. Network 443a may encompass wired and/or wireless networks such as a local-area network (LAN), a wide-area network (WAN), a computer network, a wireless network, a telecommunications network, another like network or any combination thereof. For example, network 443a may comprise a Wi-Fi network. Network connection interface 411 may be configured to include a receiver and a transmitter interface used to communicate with one or more other devices over a communication network according to one or more communication protocols, such as Ethernet, TCP/IP, SONET, ATM, or the like. Network connection interface 411 may implement receiver and transmitter functionality appropriate to the communication network links (e.g., optical, electrical, and the like). The transmitter and receiver functions may share circuit components, software or firmware, or alternatively may be implemented separately.

RAM 417 may be configured to interface via bus 402 to processing circuitry 401 to provide storage or caching of data or computer instructions during the execution of software programs such as the operating system, application programs, and device drivers. ROM 419 may be configured to provide computer instructions or data to processing circuitry 401. For example, ROM 419 may be configured to store invariant low-level system code or data for basic system functions such as basic input and output (I/O), startup, or reception of keystrokes from a keyboard that are stored in a non-volatile memory. Storage medium 421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 421 may be configured to include operating system 423, application program 425 such as a web browser application, a widget or gadget engine or another application, and data file 427. Storage medium 421 may store, for use by UE 400, any of a variety of various operating systems or combinations of operating systems.

Storage medium 421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 421 may allow UE 400 to access computer-executable instructions, application programs or the like, stored on transitory or non-transitory memory media, to off-load data, or to upload data. An article of manufacture, such as one utilizing a communication system may be tangibly embodied in storage medium 421, which may comprise a device readable medium.

In FIG. 4, processing circuitry 401 may be configured to communicate with network 443b using communication subsystem 431. Network 443a and network 443b may be the same network or networks or different network or networks. Communication subsystem 431 may be configured to include one or more transceivers used to communicate with network 443b. For example, communication subsystem 431 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 433 and/or receiver 435 to implement transmitter or receiver functionality, respectively, appropriate to the RAN links (e.g., frequency allocations and the like). Further, transmitter 433 and receiver 435 of each transceiver may share circuit components, software or firmware, or alternatively may be implemented separately.

In the illustrated embodiment, the communication functions of communication subsystem 431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 431 may include cellular communication, Wi-Fi communication, Bluetooth communication, and GPS communication. Network 443*b* may encompass wired and/or wireless networks such as a local-area network (LAN), a wide-area network (WAN), a computer network, a wireless network, a telecommunications network, another like network or any combination thereof. For example, network 443*b* may be a cellular network, a Wi-Fi network, and/or a near-field network. Power source 413 may be configured to provide alternating current (AC) or direct current (DC) power to components of UE 400.

The features, benefits and/or functions described herein may be implemented in one of the components of UE 400 or partitioned across multiple components of UE 400. Further, the features, benefits, and/or functions described herein may be implemented in any combination of hardware, software or firmware. In one example, communication subsystem 431 may be configured to include any of the components described herein. Further, processing circuitry 401 may be configured to communicate with any of such components over bus 402. In another example, any of such components may be represented by program instructions stored in memory that when executed by processing circuitry 401 perform the corresponding functions described herein. In another example, the functionality of any of such components may be partitioned between processing circuitry 401 and communication subsystem 431. In another example, the non-computationally intensive functions of any of such components may be implemented in software or firmware and the computationally intensive functions may be implemented in hardware.

Figure 5:
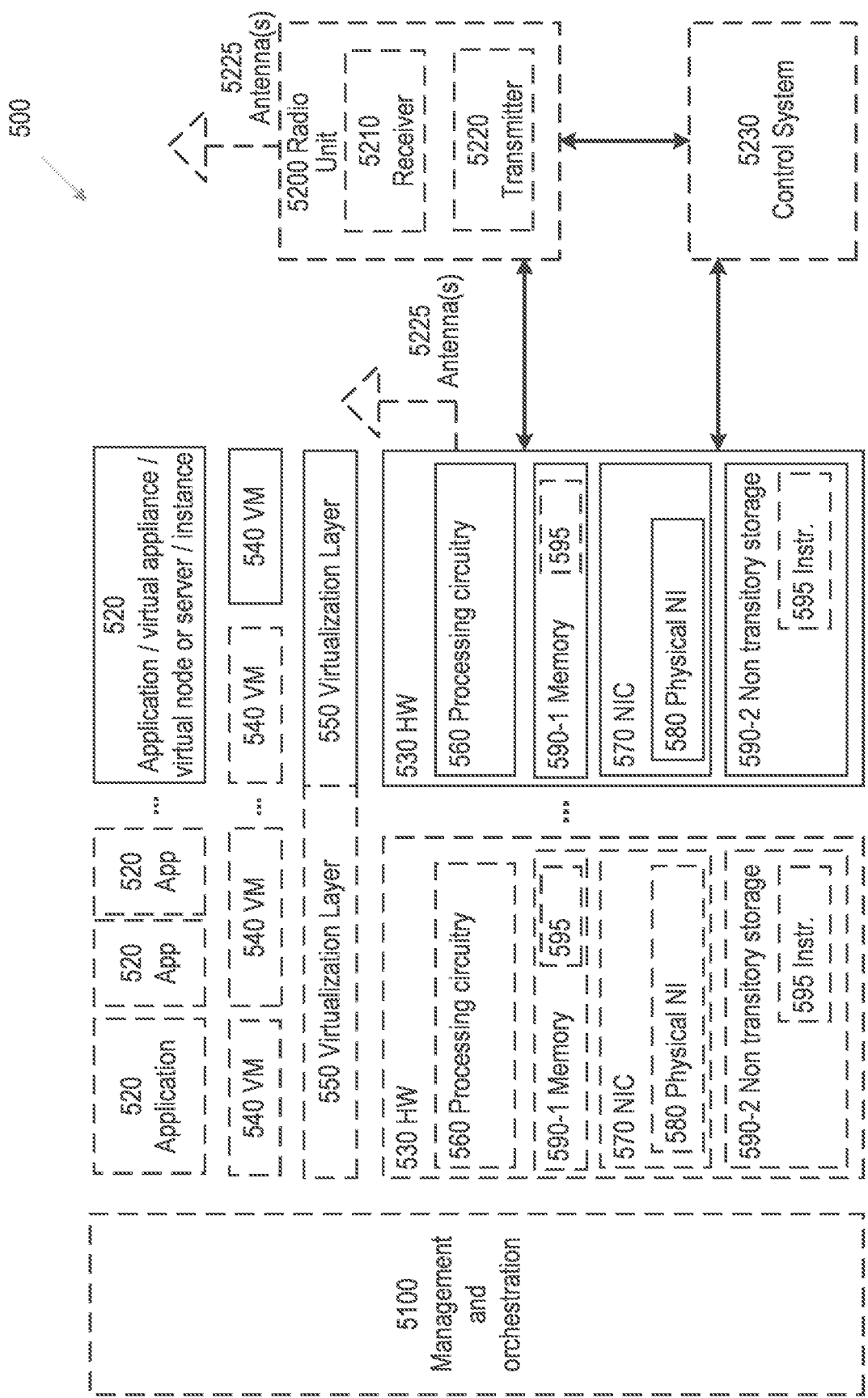
FIG. 5 is a schematic diagram of a virtualization environment in accordance with some embodiments.

FIG. 5 is a schematic block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 500 hosted by one or more of hardware nodes 530. Further, in embodiments in which the virtual node is not a radio access node or does not require radio connectivity (e.g., a core network node), then the network node may be entirely virtualized.

The functions may be implemented by one or more applications 520 (which may alternatively be called software instances, virtual appliances, network functions, virtual nodes, virtual network functions, etc.) operative to implement some of the features, functions, and/or benefits of some of the embodiments disclosed herein. Applications 520 are run in virtualization environment 500 which provides hardware 530 comprising processing circuitry 560 and memory 590. Memory 590 contains instructions 595 executable by processing circuitry 560 whereby application 520 is operative to provide one or more of the features, benefits, and/or functions disclosed herein.

Virtualization environment 500, comprises general-purpose or special-purpose network hardware devices 530 comprising a set of one or more processors or processing circuitry 560, which may be commercial off-the-shelf (COTS) processors, dedicated Application Specific Integrated Circuits (ASICs), or any other type of processing circuitry including digital or analog hardware components or special purpose processors. Each hardware device may comprise memory 590-1 which may be non-persistent memory for temporarily storing instructions 595 or software executed by processing circuitry 560. Each hardware device may comprise one or more network interface controllers (NICs) 570, also known as network interface cards, which include physical network interface 580. Each hardware device may also include non-transitory, persistent, machine-readable storage media 590-2 having stored therein software 595 and/or instructions executable by processing circuitry 560. Software 595 may include any type of software including software for instantiating one or more virtualization layers 550 (also referred to as hypervisors), software to execute virtual machines 540 as well as software allowing it to execute functions, features and/or benefits described in relation with some embodiments described herein.

Virtual machines 540, comprise virtual processing, virtual memory, virtual networking or interface and virtual storage, and may be run by a corresponding virtualization layer 550 or hypervisor. Different embodiments of the instance of virtual appliance 520 may be implemented on one or more of virtual machines 540, and the implementations may be made in different ways.

During operation, processing circuitry 560 executes software 595 to instantiate the hypervisor or virtualization layer 550, which may sometimes be referred to as a virtual machine monitor (VMM). Virtualization layer 550 may present a virtual operating platform that appears like networking hardware to virtual machine 540.

As shown in FIG. 5, hardware 530 may be a standalone network node with generic or specific components. Hardware 530 may comprise antenna 5225 and may implement some functions via virtualization. Alternatively, hardware 530 may be part of a larger cluster of hardware (e.g. such as in a data center or customer premise equipment (CPE) where many hardware nodes work together and are managed via management and orchestration (MANO) 5100, which, among others, oversees lifecycle management of applications 520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 540 may be a software implementation of a physical machine that runs programs as if they were executing on a physical, non-virtualized machine. Each of virtual machines 540, and that part of hardware 530 that executes that virtual machine, be it hardware dedicated to that virtual machine and/or hardware shared by that virtual machine with others of the virtual machines 540, forms a separate virtual network elements (VNE).

Still in the context of NFV, Virtual Network Function (VNF) is responsible for handling specific network functions that run in one or more virtual machines 540 on top of hardware networking infrastructure 530 and corresponds to application 520 in FIG. 5.

In some embodiments, one or more radio units 5200 that each include one or more transmitters 5220 and one or more receivers 5210 may be coupled to one or more antennas 5225. Radio units 5200 may communicate directly with hardware nodes 530 via one or more appropriate network interfaces and may be used in combination with the virtual components to provide a virtual node with radio capabilities, such as a radio access node or a base station.

In some embodiments, some signalling can be effected with the use of control system 5230 which may alternatively be used for communication between the hardware nodes 530 and radio units 5200.

Figure 6:
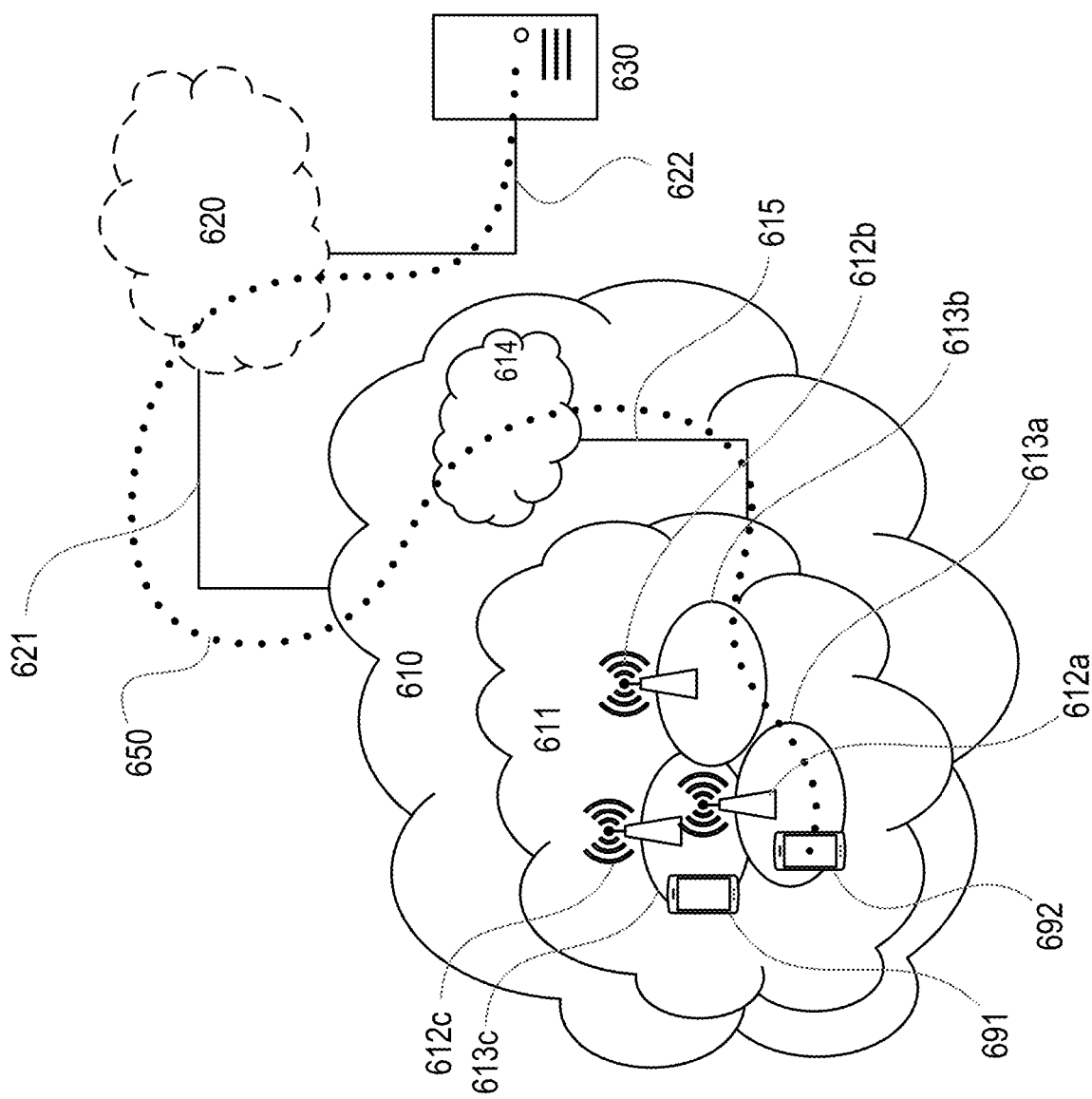
FIG. 6 is a schematic diagram of a telecommunication network connected via an intermediate network to a host computer in accordance with some embodiments.

With reference to FIG. 6, in accordance with an embodiment, a communication system includes telecommunication network 610, such as a 3GPP-type cellular network, which comprises access network 611, such as a radio access network, and core network 614. Access network 611 comprises a plurality of base stations 612a, 612b, 612c, such as NBs, eNBs, gNBs or other types of wireless access points, each defining a corresponding coverage area 613a, 613b, 613c. Each base station 612a, 612b, 612c is connectable to core network 614 over a wired or wireless connection 615. A first UE 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example, the disclosed embodiments are equally applicable to a situation where a sole UE is in the coverage area or where a sole UE is connecting to the corresponding base station 612.

Telecommunication network 610 is itself connected to host computer 630, which may be embodied in the hardware and/or software of a standalone server, a cloud-implemented server, a distributed server or as processing resources in a server farm. Host computer 630 may be under the ownership or control of a service provider, or may be operated by the service provider or on behalf of the service provider. Connections 621 and 622 between telecommunication network 610 and host computer 630 may extend directly from core network 614 to host computer 630 or may go via an optional intermediate network 620. Intermediate network 620 may be one of, or a combination of more than one of, a public, private or hosted network; intermediate network 620, if any, may be a backbone network or the Internet; in particular, intermediate network 620 may comprise two or more sub-networks (not shown).

The communication system of FIG. 6 as a whole enables connectivity between the connected UEs 691, 692 and host computer 630. The connectivity may be described as an over-the-top (OTT) connection 650. Host computer 630 and the connected UEs 691, 692 are configured to communicate data and/or signaling via OTT connection 650, using access network 611, core network 614, any intermediate network 620 and possible further infrastructure (not shown) as intermediaries. OTT connection 650 may be transparent in the sense that the participating communication devices through which OTT connection 650 passes are unaware of routing of uplink and downlink communications. For example, base station 612 may not or need not be informed about the past routing of an incoming downlink communication with data originating from host computer 630 to be forwarded (e.g., handed over) to a connected UE 691. Similarly, base station 612 need not be aware of the future routing of an outgoing uplink communication originating from the UE 691 towards the host computer 630.

Example implementations, in accordance with an embodiment, of the UE, base station and host computer discussed in the preceding paragraphs will now be described with reference to FIG. 7. In communication system 700, host computer 710 comprises hardware 715 including communication interface 716 configured to set up and maintain a wired or wireless connection with an interface of a different communication device of communication system 700. Host computer 710 further comprises processing circuitry 718, which may have storage and/or processing capabilities. In particular, processing circuitry 718 may comprise one or more programmable processors, application-specific integrated circuits, field programmable gate arrays or combinations of these (not shown) adapted to execute instructions. Host computer 710 further comprises software 711, which is stored in or accessible by host computer 710 and executable by processing circuitry 718. Software 711 includes host application 712. Host application 712 may be operable to provide a service to a remote user, such as UE 730 connecting via OTT connection 750 terminating at UE 730 and host computer 710. In providing the service to the remote user, host application 712 may provide user data which is transmitted using OTT connection 750.

Communication system 700 further includes base station 720 provided in a telecommunication system and comprising hardware 725 enabling it to communicate with host computer 710 and with UE 730. Hardware 725 may include communication interface 726 for setting up and maintaining a wired or wireless connection with an interface of a different communication device of communication system 700, as well as radio interface 727 for setting up and maintaining at least wireless connection 770 with UE 730 located in a coverage area (not shown in FIG. 7) served by base station 720. Communication interface 726 may be configured to facilitate connection 760 to host computer 710. Connection 760 may be direct or it may pass through a core network (not shown in FIG. 7) of the telecommunication system and/or through one or more intermediate networks outside the telecommunication system. In the embodiment shown, hardware 725 of base station 720 further includes processing circuitry 728, which may comprise one or more programmable processors, application-specific integrated circuits, field programmable gate arrays or combinations of these (not shown) adapted to execute instructions. Base station 720 further has software 721 stored internally or accessible via an external connection.

Communication system 700 further includes UE 730 already referred to. Its hardware 735 may include radio interface 737 configured to set up and maintain wireless connection 770 with a base station serving a coverage area in which UE 730 is currently located. Hardware 735 of UE 730 further includes processing circuitry 738, which may comprise one or more programmable processors, application-specific integrated circuits, field programmable gate arrays or combinations of these (not shown) adapted to execute instructions. UE 730 further comprises software 731, which is stored in or accessible by UE 730 and executable by processing circuitry 738. Software 731 includes client application 732. Client application 732 may be operable to provide a service to a human or non-human user via UE 730, with the support of host computer 710. In host computer 710, an executing host application 712 may communicate with the executing client application 732 via OTT connection 750 terminating at UE 730 and host computer 710. In providing the service to the user, client application 732 may receive request data from host application 712 and provide user data in response to the request data. OTT connection 750 may transfer both the request data and the user data. Client application 732 may interact with the user to generate the user data that it provides.

Figure 7:
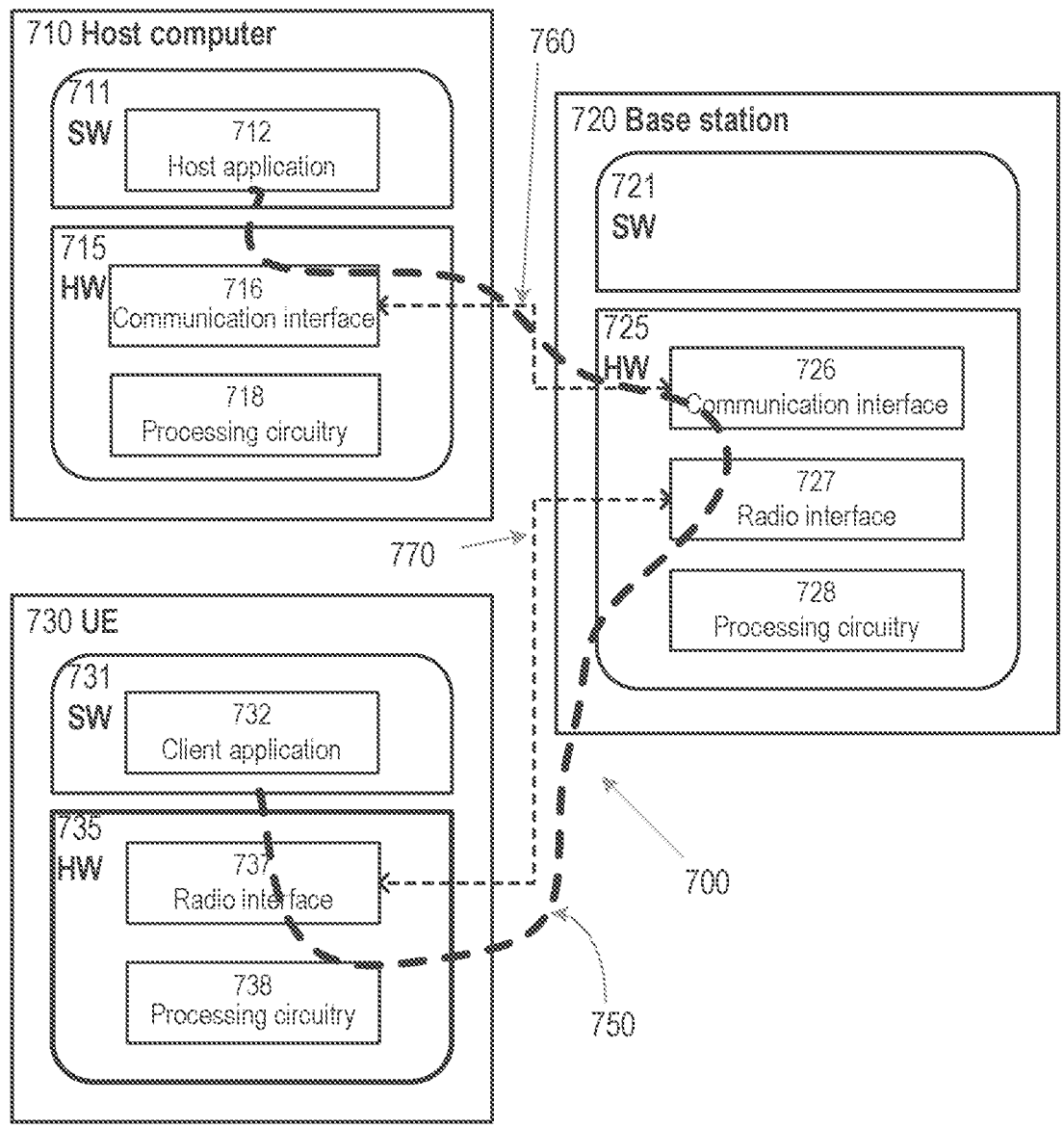
FIG. 7 is a schematic diagram of a host computer communicating via a base station with a user equipment over a partially wireless connection in accordance with some embodiments.

It is noted that host computer 710, base station 720 and UE 730 illustrated in FIG. 7 may be similar or identical to host computer 630, one of base stations 612*a*, 612*b*, 612*c* and one of UEs 691, 692 of FIG. 6, respectively. This is to say, the inner workings of these entities may be as shown in FIG. 7 and independently, the surrounding network topology may be that of FIG. 6.

In FIG. 7, OTT connection 750 has been drawn abstractly to illustrate the communication between host computer 710 and UE 730 via base station 720, without explicit reference to any intermediary devices and the precise routing of messages via these devices. Network infrastructure may determine the routing, which it may be configured to hide from UE 730 or from the service provider operating host computer 710, or both. While OTT connection 750 is active, the network infrastructure may further take decisions by which it dynamically changes the routing (e.g., on the basis of load balancing consideration or reconfiguration of the network).

Wireless connection 770 between UE 730 and base station 720 is in accordance with the teachings of the embodiments described throughout this disclosure. One or more of the various embodiments improve the performance of OTT services provided to UE 730 using OTT connection 750, in which wireless connection 770 forms the last segment. More precisely, the teachings of these embodiments may improve the packet handling and thereby provide benefits such as reduced energy consumption.

A measurement procedure may be provided for the purpose of monitoring data rate, latency and other factors on which the one or more embodiments improve. There may further be an optional network functionality for reconfiguring OTT connection 750 between host computer 710 and UE 730, in response to variations in the measurement results. The measurement procedure and/or the network functionality for reconfiguring OTT connection 750 may be implemented in software 711 and hardware 715 of host computer 710 or in software 731 and hardware 735 of UE 730, or both. In embodiments, sensors (not shown) may be deployed in or in association with communication devices through which OTT connection 750 passes; the sensors may participate in the measurement procedure by supplying values of the monitored quantities exemplified above, or supplying values of other physical quantities from which software 711, 731 may compute or estimate the monitored quantities. The reconfiguring of OTT connection 750 may include message format, retransmission settings, preferred routing etc.; the reconfiguring need not affect base station 720, and it may be unknown or imperceptible to base station 720. Such procedures and functionalities may be known and practiced in the art. In certain embodiments, measurements may involve proprietary UE signaling facilitating host computer 710's measurements of throughput, propagation times, latency and the like. The measurements may be implemented in that software 711 and 731 causes messages to be transmitted, in particular empty or 'dummy' messages, using OTT connection 750 while it monitors propagation times, errors etc.

Figure 8:
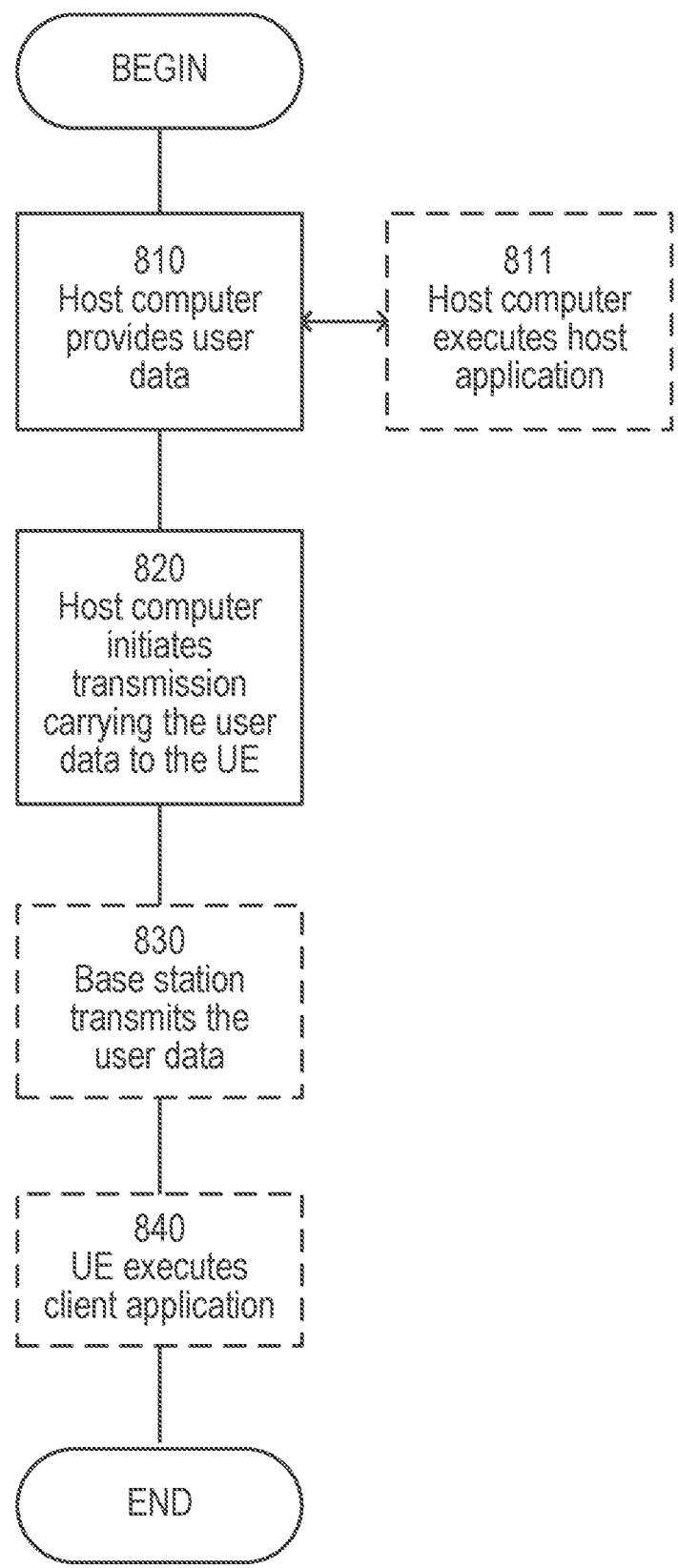
FIG. 8 is a flowchart showing methods implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step 810, the host computer provides user data. In substep 811 (which may be optional) of step 810, the host computer provides the user data by executing a host application. In step 820, the host computer initiates a transmission carrying the user data to the UE. In step 830 (which may be optional), the base station transmits to the UE the user data which was carried in the transmission that the host computer initiated, in accordance with the teachings of the embodiments described throughout this disclosure. In step 840 (which may also be optional), the UE executes a client application associated with the host application executed by the host computer.

Figure 9:
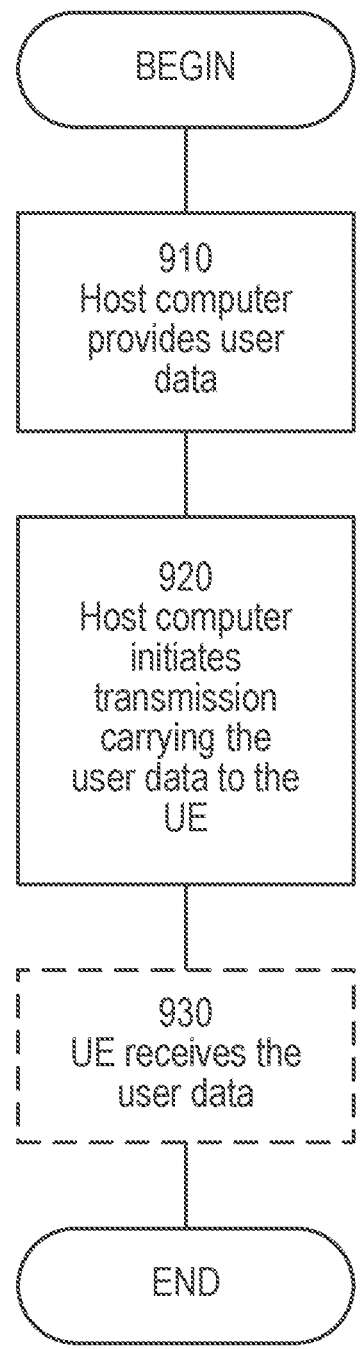
FIG. 9 is a flowchart showing methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 910 of the method, the host computer provides user data. In an optional substep (not shown) the host computer provides the user data by executing a host application. In step 920, the host computer initiates a transmission carrying the user data to the UE. The transmission may pass via the base station, in accordance with the teachings of the embodiments described throughout this disclosure. In step 930 (which may be optional), the UE receives the user data carried in the transmission.

Figure 10:
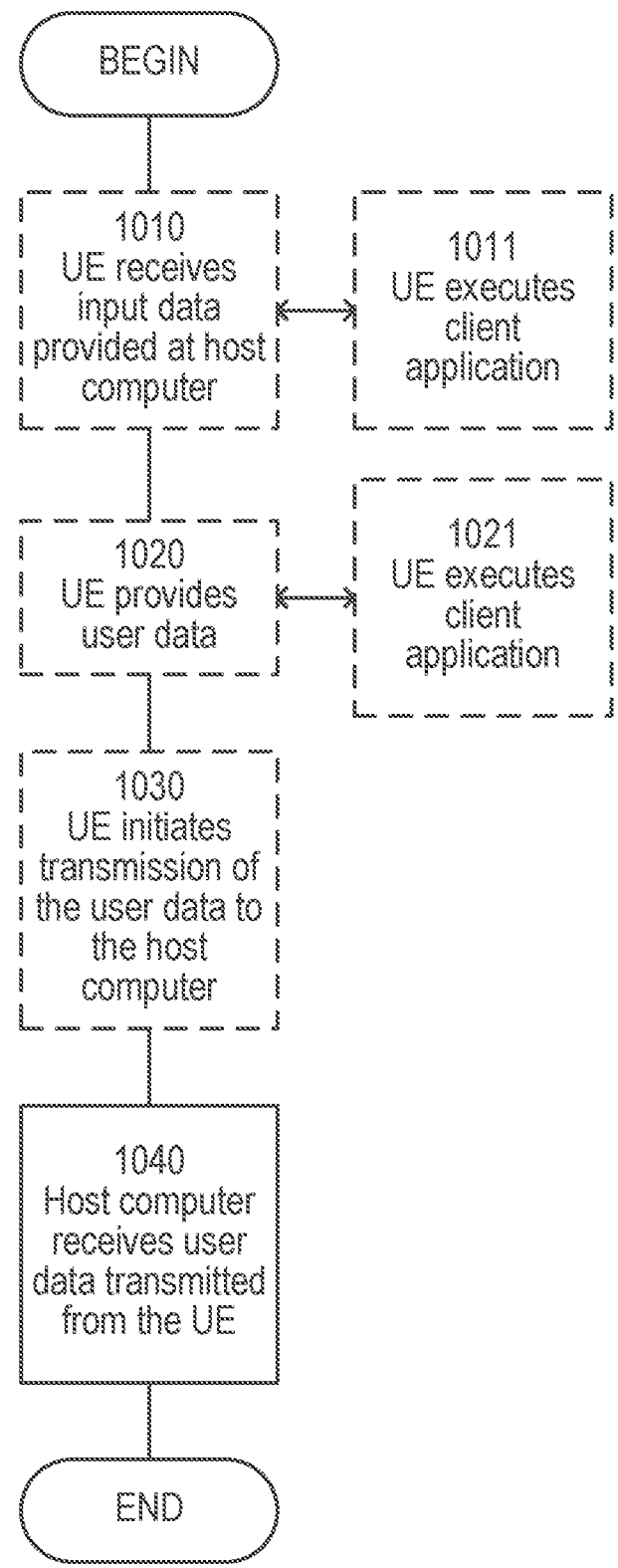
FIG. 10 is a flowchart showing methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 1010 (which may be optional), the UE receives input data provided by the host computer. Additionally or alternatively, in step 1020, the UE provides user data. In substep 1021 (which may be optional) of step 1020, the UE provides the user data by executing a client application. In substep 1011 (which may be optional) of step 1010, the UE executes a client application which provides the user data in reaction to the received input data provided by the host computer. In providing the user data, the executed client application may further consider user input received from the user. Regardless of the specific manner in which the user data was provided, the UE initiates, in substep 1030 (which may be optional), transmission of the user data to the host computer. In step 1040 of the method, the host computer receives the user data transmitted from the UE, in accordance with the teachings of the embodiments described throughout this disclosure.

Figure 11:
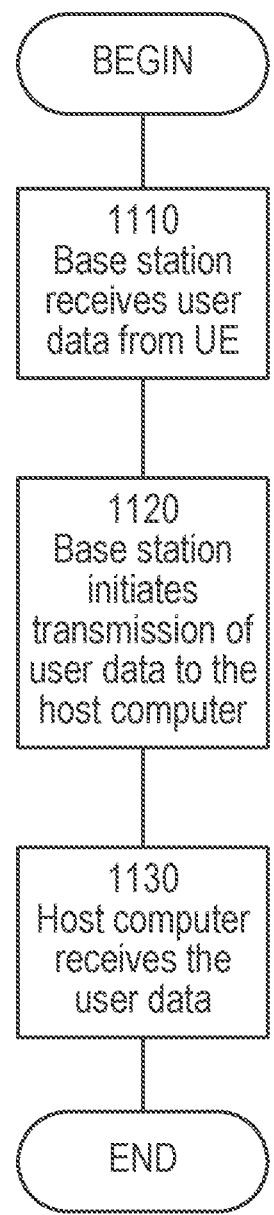
FIG. 11 is a flowchart showing methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 1110 (which may be optional), in accordance with the teachings of the embodiments described throughout this disclosure, the base station receives user data from the UE. In step 1120 (which may be optional), the base station initiates transmission of the received user data to the host computer. In step 1130 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 12:
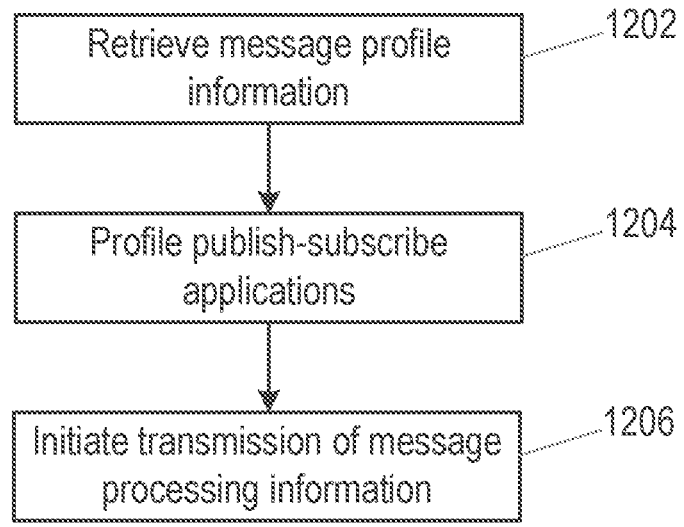
FIG. 12 is a flowchart showing methods in accordance with some embodiments

FIG. 12 depicts a method performed by a subscriber wireless device for packet processing in accordance with particular embodiments, the method begins at step 1202 with retrieving message profile information. The message profile information wherein the message profile information may indicate publish-subscribe applications executed by the subscriber wireless device. The method may further comprise, at step 1204, profiling publish-subscribe applications executed by the subscriber wireless device to determine message processing statistics; the profiling may be performed by the AF. The method may further comprise, at step 1206, initiating transmission of message processing information relating to the publish-subscribe applications executed by the subscriber wireless device to a network function. The network function in question may be the UPF, which may be executed by a CNN.

Figure 13:
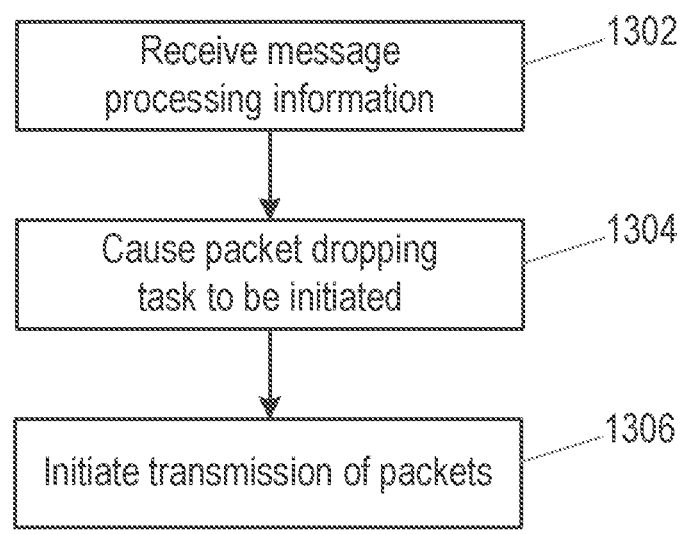
FIG. 13 is a flowchart showing methods in accordance with some embodiments

FIG. 13 depicts a method performed by a network function, such as a UPF, for packet processing in accordance with particular embodiments. The method begins at step 1302 with the network function receiving message processing information relating to one or more publish-subscribe applications executed by one or more subscriber wireless devices. The method may further comprise, at step 1304, causing a packet dropping task to be initiated. The packet dropping task may handle packets for each of the one or more publish-subscribe applications executed by the subscriber wireless devices, wherein each packet dropping task processes packets directed towards a given publish-subscribe application from among the one or more publish-subscribe applications, and wherein the processing performed by each packet dropping task comprises retaining packets directed towards the given publish-subscribe application in a task-side message buffer until a task-side message buffer capacity is reached and discarding packets directed towards the given publish-subscribe application when the task-side message buffer capacity has been reached. The method may further comprise, at step 1306, initiating transmission of the packets in the task-side message buffer towards one or more publish-subscribe applications.

Figure 14:
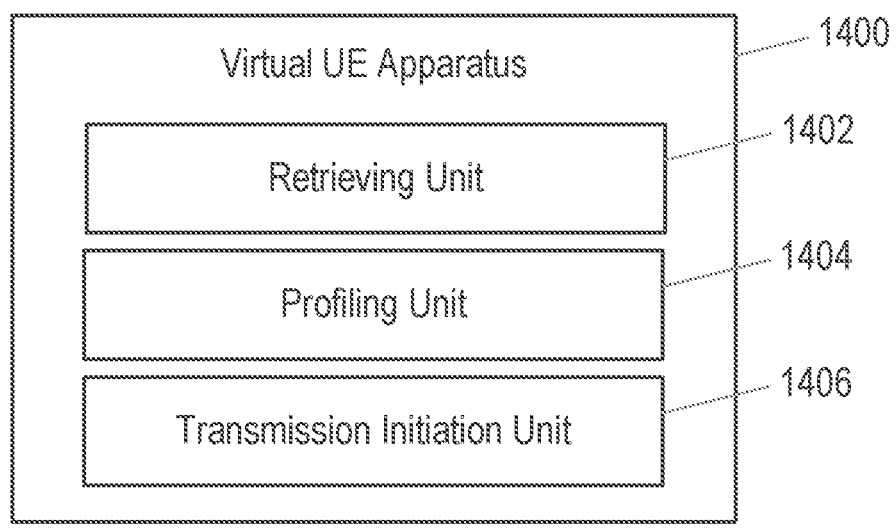
FIG. 14 is a schematic diagram of a virtualization apparatus in accordance with some embodiments.

As illustrated in FIG. 14, virtual UE apparatus 1400 includes retrieving unit 1402, profiling unit 1404 and transmission initiation unit 1406. FIG. 14 illustrates a schematic block diagram of a virtual UE apparatus 1400 in a wireless network (for example, the wireless network shown in FIG. 3). The apparatus may be implemented in one or more wireless devices (e.g. forming part of the network 306 shown in FIG. 3). Apparatus 1400 is operable to carry out the example method described with reference to FIG. 12 and possibly any other processes or methods disclosed herein. It is also to be understood that the method of FIG. 12 is not necessarily carried out solely by apparatus 1400. At least some operations of the method can be performed by one or more other entities. As illustrated in FIG. 14, virtual UE apparatus 1400 includes retrieving unit 1402, profiling unit 1404 and transmission initiation unit 1406.

Virtual Apparatus 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause retrieving unit 1402 to retrieve message profile information relating to the subscriber wireless device, profiling unit 1404 to profile publish-subscribe applications executed by the subscriber wireless device, transmission initiation unit 1406 to initiate transmission of message processing information, and any other suitable units of apparatus 1400 to perform corresponding functions according one or more embodiments of the present disclosure.

Figure 15:
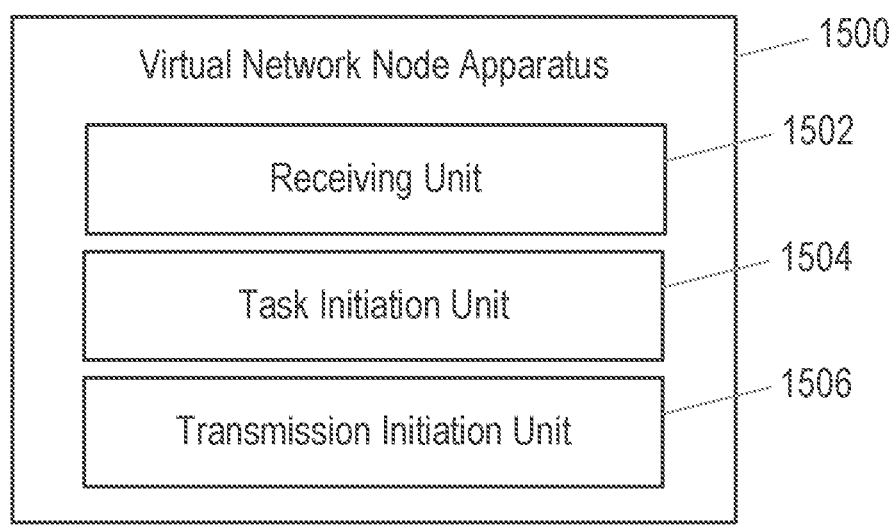
FIG. 15 is a schematic diagram of a virtualization apparatus in accordance with some embodiments There currently exist certain challenge(s). Existing packet dropping techniques in 5G systems do not exploit the opportunity for application-aware selective packet dropping provided by publish-subscribe applications, for example, using the history QoS policy in ROS2 and DDS.

As illustrated in FIG. 15, virtual network node apparatus 1500 includes receiving unit 1502, task initiation unit 1504, and transmission initiation unit 1506. FIG. 15 illustrates a schematic block diagram of a virtual network node apparatus 1500 in a wireless network (for example, a core network node in the wireless network shown in FIG. 3) The apparatus may be implemented in one or more core network nodes (e.g. forming part of the network 306 shown in FIG. 3). Apparatus 1500 is operable to carry out the example method described with reference to FIG. 13 and possibly any other processes or methods disclosed herein. It is also to be understood that the method of FIG. 13 is not necessarily carried out solely by apparatus 1500. At least some operations of the method can be performed by one or more other entities. As illustrated in FIG. 15, virtual network node apparatus 1500 includes receiving unit 1502, task initiation unit 1504 and transmission initiation unit 1506.

Virtual network node apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the receiving unit 1502 to receive message processing information relating to one or more publish-subscribe applications, to cause the task initiation unit 1504 to cause a packet dropping task to be initiated, and/or to cause the transmission initiation unit 1506 to initiate transmission of packets in the task-side message buffer.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The following numbered embodiments provide additional information on the disclosure:

1. A method performed by a subscriber wireless device for packet processing, the method comprising:
    Retrieving message profile information relating to the subscriber wireless device, wherein the message profile information indicates publish-subscribe applications executed by the subscriber wireless device;
    Profiling publish-subscribe applications executed by the subscriber wireless device to determine message processing statistics; and
    Initiating transmission of message processing information relating to the publish-subscribe applications executed by the subscriber wireless device to a network function.
2. The method of embodiment 1 further comprising the step of receiving, from the network function, packets directed towards the publish-subscribe applications executed by the subscriber wireless device.
3. The method of any preceding embodiment, wherein the message processing information comprises the message profile information relating to the subscriber wireless device retrieved by the subscriber wireless device, and wherein the message profile information comprises one or more of:
    a history Quality of Service, QoS, policy of the publishers and subscribers of the publish-subscribe applications executed by the subscriber wireless device; and
    message structure details of the publish-subscribe applications executed by the subscriber wireless device.
4. The method of any preceding embodiment, wherein the steps of profiling publish-subscribe applications and initiating transmission are performed by an Application Function, AF, hosted by the subscriber wireless device.
5. The method of embodiment 4, wherein the message profile information comprises a profiling function of the publish-subscribe applications executed by the subscriber wireless device, and wherein the AF invokes the profiling function to determine message processing statistics.
6. The method of embodiment 4 or 5, wherein the message processing information comprises the message processing statistics determined by the AF, and wherein the message processing statistics comprise one or more of:
    message receipt delay statistics for the publish-subscribe applications executed by the subscriber wireless device; and
    a message buffer drain interval for the publish-subscribe applications executed by the subscriber wireless device.
7. The method of any of embodiments 4 to 6, wherein the AF periodically initiates transmission of updated message processing information to the network function.
8. The method of any of embodiments 4 to 7, wherein the AF initiates transmission of the message processing information relating to the publish-subscribe applications executed by subscriber wireless device to the network function via an Exposure Server, ES, the Exposure server implementing a Network Exposure Function, NEF.
9. The method of any of embodiments 4 to 8, wherein the publish-subscribe applications are Robotic Operating System, ROS2, or Data Distribution Service, DDS, applications, and wherein the message profile information relating to the subscriber wireless device is retrieved and passed to the AF by a ROS2 or DDS system executed by the subscriber wireless device.
10. The method of embodiment 9, wherein the ROS2 or DDS system determines when to overwrite messages in a subscriber message buffer of the subscriber wireless device.
11. A method performed by a network function for packet processing, the method comprising:
    receiving message processing information relating to one or more publish-subscribe applications executed by one or more subscriber wireless devices;
    causing a packet dropping task to be initiated to handle packets for each of the one or more publish-subscribe applications executed by the subscriber wireless devices, wherein each packet dropping task processes packets directed towards a given publish-subscribe application from among the one or more publish-subscribe applications, and wherein the processing performed by each packet dropping task comprises retaining packets directed towards the given publish-subscribe application in a task-side message buffer until a task-side message buffer capacity is reached and discarding packets directed towards the given publish-subscribe application when the task-side message buffer capacity has been reached; and
    initiating transmission of the packets in the task-side message buffer towards one or more Publish-subscribe applications.
12. The method of embodiment 11, wherein the message processing information relating to one or more Publish-subscribe applications comprises at least one of:
    history Quality of Service, QoS, policy settings of the one or more Publish-subscribe applications executed by the subscriber wireless devices;
    message structures used by the one or more Publish-subscribe applications;
    message receipt delay statistics for the one or more Publish-subscribe applications; and
    message buffer drain statistics for the one or more Publish-subscribe applications.
13. The method of embodiment 12, wherein the network function initiates transmission of the packets in the task-side message buffer towards the given Publish-subscribe applications after a time duration T has elapsed.
14. The method of embodiment 13, wherein the value of T is determined individually for each Publish-subscribe application of the one or more Publish-subscribe applications executed by the one or more subscriber wireless devices.

15. The method of embodiment 14, wherein the value of T for a given Publish-subscribe application is determined using message buffer drain statistics and/or message receipt delay statistics for the given Publish-subscribe application.
16. The method of embodiment 15, wherein the value of T for a given Publish-subscribe application is set to half of a message buffer drain interval for the given Publish-subscribe application.
17. The method of embodiment 13, wherein the value of T is set for all of the one or more Publish-subscribe applications during network planning, or wherein the value of T is programmed separately for each of the Publish-subscribe applications.
18. The method of any of embodiments 12 to 17, wherein the message processing information relating to the one or more Publish-subscribe applications comprises history QoS policy settings of the publishers and subscribers of the one or more Publish-subscribe applications, and wherein the task-side message buffer capacity for packets directed towards a given Publish-subscribe application is determined based on the history QoS policy settings.
19. The method of embodiment 18, wherein the task-side message buffer capacity for packets directed towards a given Publish-subscribe application is the same as the subscriber-side message buffer capacity.
20. The method of any of embodiments 11 to 18 wherein, if the Publish-subscribe applications comprise a plurality of Publish-subscribe applications executed by the same subscriber wireless device and receiving packets from the same sources, the packets may be handled by a shared packet dropping task.
21. The method of embodiment 18, wherein the task-side message buffer capacity for the shared packet dropping task is determined based on the largest message buffer capacity amongst the subscriber-side message buffer capacities of the plurality of Publish-subscribe applications executed by the same subscriber wireless device and receiving packets from the same sources.
22. The method of any of embodiments 11 to 21 wherein, when discarding packets directed towards the given Publish-subscribe application, the packet dropping task discards the oldest packets in the task-side message buffer.
23. The method of any of embodiments 11 to 22 wherein the network function is a User Plane Function, UPF.
24. The method of embodiment 23, wherein the UPF is executed by a core network node, CNN.
25. The method of embodiment 24, wherein the core network node comprises an Exposure Server, ES, that executes a Network Exposure Function, NEF.
26. The method of any of embodiments 11 to 25, wherein the publish-subscribe applications are Robotic Operating System, ROS2, or Data Distribution Service, DDS, applications.
27. The method of any of embodiments 11 to 26, further comprising:
obtaining user data; and
forwarding the user data to a host computer or a wireless device.
28. A wireless device for packet processing, the wireless device comprising:
processing circuitry configured to perform any of the steps of any of embodiments 1 to 10; and
power supply circuitry configured to supply power to the wireless device.
29. A core network node configured to execute a network function for packet processing, the core network node comprising:
processing circuitry configured to perform any of the steps of any of embodiments 11 to 27;
power supply circuitry configured to supply power to the core network node.
30. A user equipment (UE) for packet processing, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of embodiments 1 to 10;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.
31. A communication system including a host computer comprising:
processing circuitry configured to provide user data; and
a communication interface configured to forward the user data to a cellular network for transmission to a user equipment (UE),
wherein the cellular network comprises a core network node having an interface and processing circuitry, the core network node's processing circuitry configured to perform any of the steps of any of embodiments 11 to 27.
32. The communication system of embodiment 31 further including the core network node.
33. The communication system of any of embodiments 31 and 32, further including the UE, wherein the UE is configured to communicate with the core network node.
34. The communication system of any of embodiments 31 to 33, wherein:
the processing circuitry of the host computer is configured to execute a host application, thereby providing the user data; and
the UE comprises processing circuitry configured to execute a client application associated with the host application.
35. A method implemented in a communication system including a host computer, a core network node and a user equipment (UE), the method comprising:
at the host computer, providing user data; and
at the host computer, initiating a transmission carrying the user data to the UE via a cellular network comprising the core network node, wherein the core network node performs any of the steps of any of embodiments 11 to 27.
36. The method of embodiment 35, further comprising, at the core network node, transmitting the user data.
37. The method of any of embodiments 35 and 36, wherein the user data is provided at the host computer by executing a host application, the method further comprising, at the UE, executing a client application associated with the host application.

38. A user equipment (UE) configured to communicate with a core network node, the UE comprising a radio interface and processing circuitry configured to perform any of the methods of any of embodiments 35 to 37.

39. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of embodiments 1 to 10.

40. The communication system of embodiment 39, wherein the cellular network further includes a core network node configured to communicate with the UE.

41. The communication system of any of embodiments 39 and 40, wherein:
the processing circuitry of the host computer is configured to execute a host application, thereby providing the user data; and
the UE's processing circuitry is configured to execute a client application associated with the host application.

42. A method implemented in a communication system including a host computer, a core network node and a user equipment (UE), the method comprising:
at the host computer, providing user data; and
at the host computer, initiating a transmission carrying the user data to the UE via a cellular network comprising the core network node, wherein the UE performs any of the steps of any of embodiments 1 to 10.

43. The method of embodiment 42, further comprising at the UE, receiving the user data from the core network node.

44. A communication system including a host computer comprising:
communication interface configured to receive user data originating from a transmission from a user equipment (UE) to a core network node,
wherein the UE comprises a radio interface and processing circuitry, the UE's processing circuitry configured to perform any of the steps of any of embodiments 1 to 10.

45. The communication system of embodiment 44, further including the UE.

46. The communication system of any of embodiments 44 and 45, further including the core network node, wherein the core network node comprises an interface configured to communicate with the UE and a communication interface configured to forward to the host computer the user data carried by a transmission from the UE to the core network node.

47. The communication system of any of embodiments 44 to 46, wherein:
the processing circuitry of the host computer is configured to execute a host application; and
the UE's processing circuitry is configured to execute a client application associated with the host application, thereby providing the user data.

48. The communication system of any of embodiments 44 to 47, wherein:
the processing circuitry of the host computer is configured to execute a host application, thereby providing request data; and
the UE's processing circuitry is configured to execute a client application associated with the host application, thereby providing the user data in response to the request data.

49. A method implemented in a communication system including a host computer, a core network node and a user equipment (UE), the method comprising:
at the host computer, receiving user data transmitted to the core network node from the UE, wherein the UE performs any of the steps of any of embodiments 1 to 10.

50. The method of embodiment 49, further comprising, at the UE, providing the user data to the core network node.

51. The method of any of embodiments 49 and 50, further comprising:
at the UE, executing a client application, thereby providing the user data to be transmitted; and
at the host computer, executing a host application associated with the client application.

52. The method of any of embodiments 49 to 51, further comprising:
at the UE, executing a client application; and
at the UE, receiving input data to the client application, the input data being provided at the host computer by executing a host application associated with the client application,
wherein the user data to be transmitted is provided by the client application in response to the input data.

53. A communication system including a host computer comprising a communication interface configured to receive user data originating from a transmission from a user equipment (UE) to a core network node, wherein the core network node comprises an interface and processing circuitry, the core network node's processing circuitry configured to perform any of the steps of any of embodiments 11 to 27.

54. The communication system of embodiment 53 further including the core network node.

55. The communication system of any of embodiments 53 and 54, further including the UE, wherein the UE is configured to communicate with the core network node.

56. The communication system of any of embodiments 53 to 55, wherein:
the processing circuitry of the host computer is configured to execute a host application;
the UE is configured to execute a client application associated with the host application, thereby providing the user data to be received by the host computer.

57. A method implemented in a communication system including a host computer, a core network node and a user equipment (UE), the method comprising:
at the host computer, receiving, from the core network node, user data originating from a transmission which the core network node has received from the UE, wherein the UE performs any of the steps of any of embodiments 1 to 10.

58. The method of embodiment 57, further comprising at the core network node, receiving the user data from the UE.

59. The method of any of embodiments 57 and 58, further comprising at the core network node, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

5GS 5G System
5QI 5G QoS Indicator
AF Application Function
AMR Autonomous Mobile Robot
CN Core Network
CNN Core Network Node
ES Exposure Server
IMU Inertial Measurement Unit
QoS Quality of Service
NEF Network Exposure Function
RAN Radio Access Network
SLAM Simultaneous Localization and Mapping
UE User Equipment
UPF User Plane Function
VIO Visual Inertial Odometry
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a subscriber wireless device for packet processing, the method comprising:
retrieving message profile information relating to the subscriber wireless device, the message profile information indicating publish-subscribe applications executed by the subscriber wireless device;
profiling publish-subscribe applications executed by the subscriber wireless device to determine message processing statistics, the message profile information comprising a history of Quality of Service, QoS, policy of publishers and subscribers of the publish-subscribe applications executed by the subscriber wireless device; and
initiating transmission of message processing information relating to the publish-subscribe applications executed by the subscriber wireless device to a network function, the publish-subscribe applications being Robotic Operating System, ROS2, or Data Distribution Service, DDS, applications, and the ROS2 or DDS determining when to overwrite messages in a subscriber message buffer of the subscriber wireless device;
the profiling publish-subscribe applications and initiating transmission performed by an Application Function, AF, hosted by the subscriber wireless device and the AF initiating transmission of the message processing information relating to the publish-subscribe applications executed by subscriber wireless device to the network function via an Exposure Server, ES, the Exposure server implementing a Network Exposure Function, NEF.

2. The method of claim 1 further comprising the step of receiving, from the network function, packets directed towards the publish-subscribe applications executed by the subscriber wireless device.

3. The method of claim 1, wherein the message processing information comprises the message profile information relating to the subscriber wireless device retrieved by the subscriber wireless device, and wherein the message profile information comprises:
message structure details of the publish-subscribe applications executed by the subscriber wireless device.

4. The method of claim 1, wherein the message profile information comprises a profiling function of the publish-subscribe applications executed by the subscriber wireless device, and wherein the AF invokes the profiling function to determine message processing statistics.

5. The method of claim 1, wherein the message processing information comprises the message processing statistics determined by the AF, and wherein the message processing statistics comprise one or more of:

message receipt delay statistics for the publish-subscribe applications executed by the subscriber wireless device; and
a message buffer drain interval for the publish-subscribe applications executed by the subscriber wireless device.

6. The method of claim 1, wherein the AF periodically initiates transmission of updated message processing information to the network function.

7. The method of claim 1, wherein the message profile information relating to the subscriber wireless device is retrieved and passed to the AF by a ROS2 or DDS system executed by the subscriber wireless device.

8. A method performed by a network function for packet processing, the method comprising:
receiving message processing information relating to one or more publish-subscribe applications executed by one or more subscriber wireless devices, the message processing information comprising history Quality of Service, QoS, policy settings of the one or more publish-subscribe applications executed by the one or more subscriber wireless devices;
causing a packet dropping task to be initiated to handle packets for each of the one or more publish-subscribe applications executed by the subscriber wireless devices, wherein each packet dropping task processes packets directed towards a given publish-subscribe application from among the one or more publish-subscribe applications, and wherein the processing performed by each packet dropping task comprises retaining packets directed towards the given publish-subscribe application in a task-side message buffer until a task-side message buffer capacity is reached and discarding packets directed towards the given publish-subscribe application when the task-side message buffer capacity has been reached; and
initiating transmission of the packets in the task-side message buffer towards one or more publish-subscribe applications, the publish-subscribe applications being Robotic Operating System, ROS2, or Data Distribution Service, DDS, applications, the network function initiating transmission of the packets in the task-side message buffer towards the given publish-subscribe applications after a time duration T has elapsed and the value of T for a given Publish-subscribe application being set to half of a message buffer drain interval for the given Publish-subscribe application.

9. The method of claim 8, wherein the message processing information relating to one or more publish-subscribe applications comprises at least one of:
message structures used by the one or more Publish-subscribe applications;
message receipt delay statistics for the one or more Publish-subscribe applications; and
message buffer drain statistics for the one or more Publish-subscribe applications.

10. The method of claim 8, wherein the value of T is determined individually for each Publish-subscribe application of the one or more Publish-subscribe applications executed by the one or more subscriber wireless devices.

11. The method of claim 10, wherein the value of T for a given Publish-subscribe application is determined using one or both of message buffer drain statistics and message receipt delay statistics for the given Publish-subscribe application.

12. The method of claim 8, wherein the value of T is set for all of the one or more Publish-subscribe applications during network planning, or wherein the value of T is programmed separately for each of the Publish-subscribe applications.

13. The method of claim 9, wherein the task-side message buffer capacity for packets directed towards a given Publish-subscribe application is determined based on the history QoS policy settings.

14. The method of claim 13, wherein the task-side message buffer capacity for packets directed towards a given Publish-subscribe application is the same as the subscriber-side message buffer capacity.

15. A subscriber wireless device for packet processing, the subscriber wireless device comprising:
  processing circuitry configured to cause the subscriber wireless device to: retrieve message profile information relating to the subscriber wireless device, wherein the message profile information indicates publish-subscribe applications executed by the subscriber wireless device; profile publish-subscribe applications executed by the subscriber wireless device to determine message processing statistics, the message profile information comprising a history of Quality of Service, QoS, policy of publishers and subscribers of the publish-subscribe applications executed by the subscriber wireless device; and initiate transmission of message processing information relating to the publish-subscribe applications executed by the subscriber wireless device to a network function; the profiling publish-subscribe applications and initiating transmission performed by an Application Function, AF, hosted by the subscriber wireless device and the AF initiating transmission of the message processing information relating to the publish-subscribe applications executed by subscriber wireless device to the network function via an Exposure Server, ES, the Exposure server implementing a Network Exposure Function, NEF; and
  power supply circuitry configured to supply power to the subscriber wireless device, the publish-subscribe applications being Robotic Operating System, ROS2, or Data Distribution Service, DDS, applications, and the ROS2 or DDS determining when to overwrite messages in a subscriber message buffer of the subscriber wireless device.

16. A core network node configured to execute a network function for packet processing, the core network node comprising:
  processing circuitry configured to execute network function steps of: receiving message processing information relating to one or more publish-subscribe applications executed by one or more subscriber wireless devices, the message processing information comprising history Quality of Service, QoS, policy settings of the one or more publish-subscribe applications executed by the one or more subscriber wireless devices; causing a packet dropping task to be initiated to handle packets for each of the one or more publish-subscribe applications executed by the subscriber wireless devices, wherein each packet dropping task processes packets directed towards a given publish-subscribe application from among the one or more publish-subscribe applications, and wherein the processing performed by each packet dropping task comprises retaining packets directed towards the given publish-subscribe application in a task-side message buffer until a task-side message buffer capacity is reached and discarding packets directed towards the given publish-subscribe application when the task-side message buffer capacity has been reached; and initiating transmission of the packets in the task-side message buffer towards one or more publish-subscribe applications, the network function initiating transmission of the packets in the task-side message buffer towards the given Publish-subscribe applications after a time duration T has elapsed and the value of T for a given Publish-subscribe application being set to half of a message buffer drain interval for the given Publish-subscribe application; and
  power supply circuitry configured to supply power to the core network node, the publish-subscribe applications being Robotic Operating System, ROS2, or Data Distribution Service, DDS, applications.

* * * * *